(12) United States Patent
Ghozlan et al.

(10) Patent No.: US 11,909,697 B2
(45) Date of Patent: Feb. 20, 2024

(54) REMOTE INTERFERENCE MANAGEMENT REFERENCE SIGNAL

(71) Applicant: Apple Inc., Cupertino, CA (US)

(72) Inventors: Hassan Ghozlan, Hillsboro, OR (US); Qian Li, Beaverton, OR (US); Dawei Ying, Hillsboro, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/947,767

(22) Filed: Sep. 19, 2022

(65) Prior Publication Data

US 2023/0014343 A1      Jan. 19, 2023

Related U.S. Application Data

(60) Division of application No. 17/289,922, filed as application No. PCT/US2019/059233 on Oct. 31, 2019, which is a continuation-in-part of application No. PCT/US2019/052361, filed on Sep. 23, 2019.

(60) Provisional application No. 62/755,389, filed on Nov. 2, 2018.

(51) Int. Cl.
*H04L 5/14* (2006.01)
*H04B 17/345* (2015.01)
*H04J 11/00* (2006.01)
*H04J 13/00* (2011.01)
(Continued)

(52) U.S. Cl.
CPC ......... *H04L 5/1469* (2013.01); *H04B 17/345* (2015.01); *H04J 11/0056* (2013.01); *H04J 13/0029* (2013.01); *H04J 13/0062* (2013.01); *H04L 5/005* (2013.01); *H04L 5/0051* (2013.01); *H04L 27/2602* (2013.01);
(Continued)

(58) Field of Classification Search
CPC ............ H04W 72/0446; H04W 72/082; H04L 25/0226; H04L 5/0048; H04L 5/0051; H04L 27/26132; H04L 5/0007; H04L 27/2613; H04B 17/345
See application file for complete search history.

(56) References Cited

U.S. PATENT DOCUMENTS

| | | |
|---|---|---|
| 2006/0120302 A1 | 6/2006 | Poncini et al. |
| 2012/0294225 A1 | 11/2012 | Awad et al. |
| 2016/0286432 A1 | 9/2016 | Centonza et al. |

(Continued)

FOREIGN PATENT DOCUMENTS

| | | |
|---|---|---|
| CN | 1791109 A | 6/2006 |
| WO | WO 2015/174800 A1 | 11/2015 |

OTHER PUBLICATIONS

Extended European Search Report from related European Application No. 19879757.3, mailed Jun. 22, 2022; 9 pages.

(Continued)

*Primary Examiner* — Aristocratis Fotakis
(74) *Attorney, Agent, or Firm* — Sterne, Kessler, Goldstein & Fox P.L.L.C.

(57) ABSTRACT

Systems, apparatuses, methods, and computer-readable media are provided for remote interference management (RIM) in wireless networks, including RIM reference signals (RIM-RS) transmitted to assist victim radio access network (RAN) nodes to identify aggressor RAN nodes due to, for example, atmospheric ducting. The RIM-RS is also flexibly configured. Other embodiments may be described and/or claimed.

20 Claims, 11 Drawing Sheets

(51) Int. Cl.
*H04L 27/26* (2006.01)
*H04L 5/00* (2006.01)

(52) U.S. Cl.
CPC ........ *H04L 27/2613* (2013.01); *H04L 5/0007* (2013.01); *H04L 27/26025* (2021.01); *H04L 27/26132* (2021.01)

(56) References Cited

U.S. PATENT DOCUMENTS

| | | | |
|---|---|---|---|
| 2017/0230152 | A1 | 8/2017 | Byun et al. |
| 2018/0184433 | A1 | 6/2018 | Kim et al. |
| 2020/0322963 | A1* | 10/2020 | Li .................... H04W 72/541 |
| 2021/0219304 | A1* | 7/2021 | Xu .................... H04J 11/0056 |
| 2021/0376981 | A1 | 12/2021 | Shen et al. |
| 2021/0410081 | A1* | 12/2021 | Xu .................... H04W 72/54 |
| 2022/0006552 | A1 | 1/2022 | Ghozlan et al. |
| 2022/0150012 | A1 | 5/2022 | Su et al. |

OTHER PUBLICATIONS

Ericsson, "On encoding of gNB set ID in RIM-RS," R1-1811439, 3GPP TSG-RAN WG1 Meeting #94bis, Chengdu, China, Oct. 8-12, 2018; 6 pages.

CMCC, "Draft summary on Study on NR-RIM," R1-1811884, 3GPP TSG RAN WG1 Meeting #94bis, Chengdu, China, Oct. 8-12, 2018; 36 pages.

CMCC, "Updated summary for NR-RIM," R1-1812060, 3GPP TSG RAN WG1 Meeting #94bis, Chengdu, China, Oct. 8-12, 2018; 37 pages.

International Search Report and Written Opinion of the International Searching Authority directed to related International Patent Application No. PCT/US2019/059233, dated Feb. 24, 2020; 12 pages.

CMCC, 'Discussion on RS design for RIM', RI-1811042, 3GPP TSG RAN WGI Meeting #94bis, Chengdu, China, Sep. 29, 2018, sections 2-3.3 and figures 3, 5.

LG Electronics, 'Discussion on reference signal design for NR RIM support', RI-1810292, 3GPP TSG RAN WGI Meeting #94bis, Chengdu, China, Sep. 29, 2018, sections 1-2.3 and figures 1.

Huawei et al., 'Discussion on reference signal design for identifying remote interference,' RI-1810149, 3GPP TSG RAN WGI Meeting #94bis , Chengdu, China, Sep. 29, 2018 sections 1, 2.2-2.5; and figures 2-1, 2-4, 2-5, 2-7.

ZTE, "Consideration on RIM framework and mechanisms for improving network robustness," 3GPP TSG RAN WG1, Meeting #94, Aug. 11, 2018, R1-1808325, 7 pages.

China Telecom, "Discussion on Reference Signal Design for Rim," 3GPP TSG RAN WG1, Meeting #94bis, Sep. 29, 2018, R1-1811608, 4 pages.

\* cited by examiner

US 11,909,697 B2

REMOTE INTERFERENCE MANAGEMENT REFERENCE SIGNAL

RELATED APPLICATIONS

The present application is a divisional of U.S. Nonprovisional application Ser. No. 17/289,922, filed on Apr. 29, 2021, which is a U.S. National Stage entry of PCT/US2019/059233, filed on Oct. 31, 2019, which claims benefit of U.S. Provisional App. No. 62/755,389, filed Nov. 2, 2018, and U.S. National Stage entry of PCT/US2019/059233 is a continuation-in-part of PCT App. No. PCT/US2019/052361, filed Sep. 23, 2019, the contents of all of which are hereby incorporated by reference in their entireties.

FIELD

Various embodiments of the present application generally relate to the field of wireless communications, and in particular, to remote interference management (RIM) techniques.

BACKGROUND

In commercial Long Term Evolution (LTE) Time Division Duplex (TDD) networks with a relatively large amount of macrocell Radio Access Network (RAN) node (e.g., evolved NodeBs (eNBs)), Interference-Over-Thermal (I-o-T) at the eNBs was observed to intermittently deteriorate, which severely impacted network coverage and successful connection rate. I-o-T statistics from the RAN nodes in regions with forecasted troposphere bending, as well as the symptoms varying with the artificially constructed transmission patterns, showed that this kind of I-o-T degradation was caused by downlink (DL) signaling from remote RAN nodes as long as the atmospheric conditions were favorable for producing troposphere bending of radio waves. It is expected that New Radio (NR) TDD deployments may also suffer from atmospheric ducting interference.

Adaptive mechanisms can be used to mitigate the impact of this kind of remote interference without severely sacrificing network resources. Some of the adaptive mechanism involve victim being triggered to transmit a specific signal in a window in response to detecting abnormal I-o-T enhancements. Each RAN node that detects the specific signal in a window will identify itself as the contributor of the deteriorated I-o-T in some nodes, and then it may take some action, for example, reconfiguring a guard period (GP) or some other parameters to reduce its contribution to the interference.

DETAILED DESCRIPTION

Embodiments discussed herein provide techniques for Remote Interference Management (RIM) in wireless networks, including RIM reference signals (RIM-RS) transmitted to assist Radio Access Network (RAN) nodes to identify aggressors due to, for example, atmospheric ducting. The embodiments herein provide configuration details of the RIM-RSs including, but not limited to, time-location of transmission, transmission periodicity, and time-domain repetition. Other embodiments may be described and/or claimed.

Figure 1:
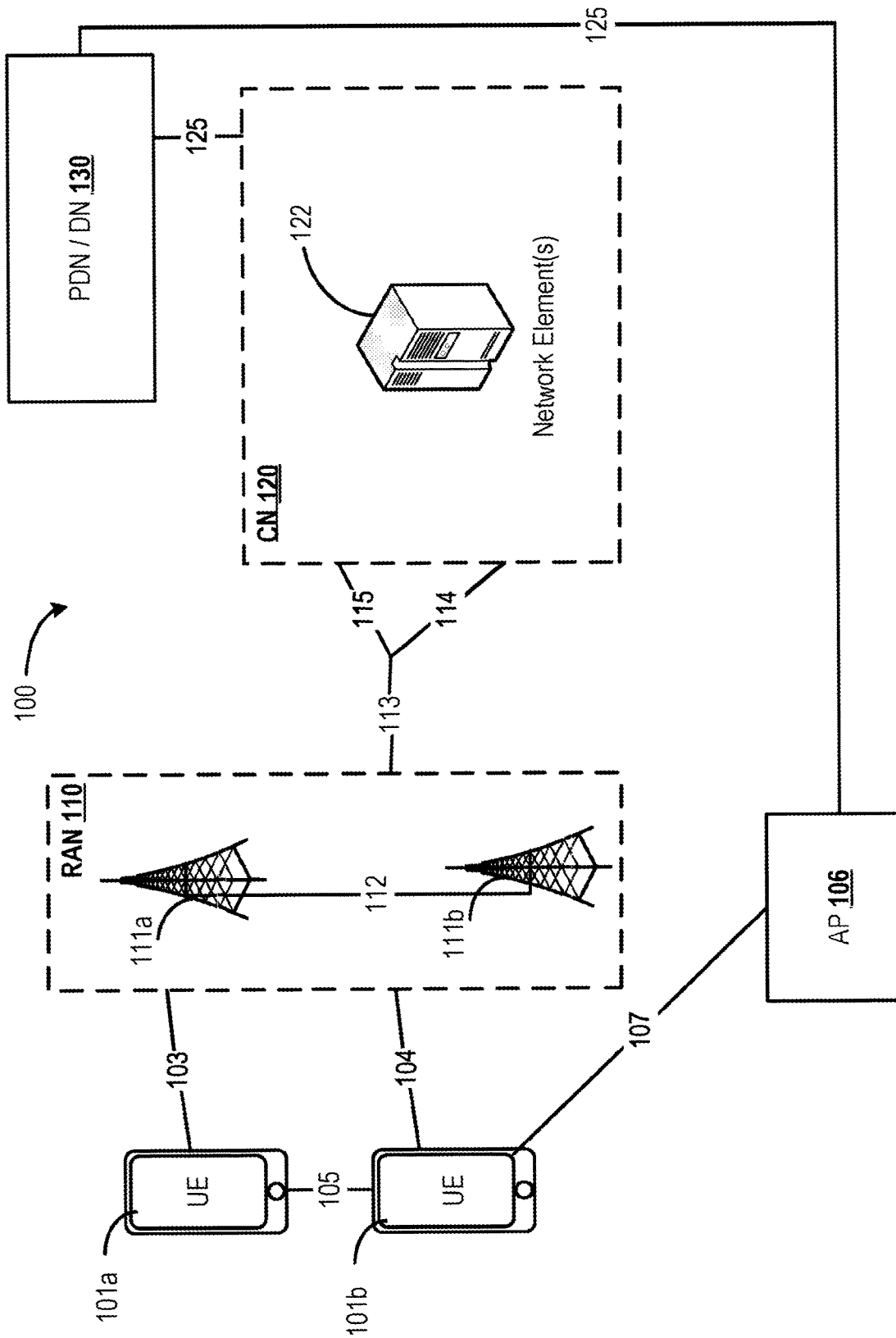
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the Fifth Generation (5G) or New Radio (NR) system standards or Long Term Evolution (LTE) system standards as provided by the Third Generation Partnership Project (3GPP) technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., Wireless Metropolitan Area Network (WMAN), Worldwide Interoperability for Microwave Access (WiMAX), etc.), or the like.

As shown by FIG. 1, the system 100 includes user equipment (UE) 101a and UE 101b (collectively referred to as "UEs 101" or "UE 101"). A UE 101 is any device with radio communication capabilities, such as a wireless communications interface, and describes a remote user of network resources in a communications network. In this example, UEs 101 are illustrated as smartphones, but may also comprise any mobile or non-mobile computing device, such as consumer tablet computers, wearable devices, desktop computers, laptop computers, in-vehicle infotainment (IVI) devices, head-up display (HUD) devices, Internet of Things (IoT) devices, embedded systems or microcontrollers, networked or "smart" appliances, and/or the like. The UEs 101 include various hardware elements such as baseband circuitry, memory circuitry, radiofrequency (RF) circuitry, and interface circuitry (e.g., input/output (I/O) interfaces), some or all of which may be coupled with one another via a suitable interconnect (IX) technology. The RF circuitry includes various hardware elements (e.g., switches, filters, amplifiers, digital signal processors (DSPs), etc.) configured to enable communication with wireless networks using modulated electromagnetic radiation through a non-solid medium. The electronic elements may be arranged as receive signal path (or receiving (Rx) RF chain) to downconvert received RF signals and provide baseband signals to the baseband circuitry, and arranged as a transmit signal path to up-convert baseband signals provided by the baseband circuitry and provide RF output signals to an antenna array via a front-end module for transmission. The baseband circuitry and RF circuitry allow the UEs 101 to connect or communicatively couple with a Radio Access Network (RAN) 110.

The UE 101b is shown to be configured to access an access point (AP) 106 via connection 107. The connection 107 can comprise a local wireless area network (WLAN) connection consistent with any IEEE 802.11 protocol, wherein the AP 106 may be a WiFi® router, gateway appliance, or the like. In this example, the AP 106 is shown to be connected to the Internet without connecting to the core network of the wireless system (described in further detail below). In various embodiments, the UE 101b, RAN 110, and AP 106 may be configured to utilize LTE-WLAN aggregation (LWA) operation and/or LTE/WLAN Radio Level Integration with IPsec Tunnel (LWIP) operation.

The RAN 110 is a set of RAN nodes 111 that implement a Radio Access Technology (RAT); the term "RAT" as used herein refers to a type of technology used for radio access such as NR, E-UTRA, WiFi/WLAN, and/or the like. The set of RAN nodes 111 in the RAN 110 are connected to one another via interface 112 and connected to the CN 120 through interface 113. In embodiments, the RAN 110 may be a Universal Terrestrial Radio Access Network (UTRAN) or Groupe Special Mobile (GSM)/Enhanced Datarates for GSM (EDGE) RAN (GERAN) when system 100 is an UTRAN or GERAN system, an Evolved UTRAN (E-UTRAN) when system 100 is an LTE or 4G system, or a next generation (NG) RAN or a 5G RAN when system 100 is an NR/5G system. The UEs 101 utilize connections (or channels) 103 and 104, respectively, each of which comprises a physical communications interface or layer. The term "channel" or "link" as used herein refers to any transmission medium, either tangible or intangible, which is used to communicate data or a data stream. Additionally, the term "link" as used herein refers to a connection between two devices through a RAT for the purpose of transmitting and receiving information. In FIG. 1, the connections 103 and 104 are illustrated as an air interface to enable communicative coupling, and can be consistent with cellular communications protocols, such as GSM, Code-Division Multiple Access (CDMA), Push-to-Talk (PTT) and/or PPT over cellular (POC), UMTS, LTE, 5G/NR, and/or the like. The UEs 101 may also directly exchange data via a Proximity Services (ProSe) or sidelink (SL) interface 105 comprising one or more physical and/or logical SL channels.

The RAN 110 includes one or more RAN nodes 111a and 111b (collectively referred to as "RAN nodes 111" or "RAN node 111") that enable the connections 103 and 104. The RAN nodes 111 are infrastructure equipment that provide the radio baseband functions for data and/or voice connectivity between a network (e.g., core network (CN) 120) and one or more users (e.g., UEs 101). The RAN nodes 111 can be referred to as NodeBs 111 in UMTS systems, evolved NodeBs (eNBs) 111 in LTE systems, next generation NodeBs (gNBs) 111 or next generation eNBs (ng-eNBs) in 5G/NR systems, Road Side Units (RSUs) for vehicle-to-everything (V2X) implementations, and so forth.

The RAN nodes 111 can comprise ground stations (e.g., terrestrial access points) or satellite stations providing coverage within a geographic area (e.g., a cell). The RAN nodes 111 may be implemented as one or more dedicated physical devices such as a macrocell base stations, and/or a low power base stations for providing femtocells, picocells, or other like cells having smaller coverage areas, smaller user capacity, or higher bandwidth (BW) compared to macrocells. Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some embodiments, all or parts of the RAN nodes 111 may be implemented as one or more software entities running on server computers as part of a virtual network (e.g., a cloud RAN (CRAN), virtual baseband unit pool (vBBUP), or the like). In these embodiments, the RAN nodes 111 may implement a RAN function split where different protocol entities are operated by different elements. The term "element" as used herein refers to a unit that is indivisible at a given level of abstraction and has a clearly defined boundary. One or more RAN nodes 111 may represent individual distributed units (DUs) that are connected to centralized unit (CU) via respective F1 interfaces (not shown by FIG. 1). In these implementations, the gNB-DUs may include one or more remote radio heads or RFEMs, and the gNB-CU may be operated by a server that is located in the RAN 110 (not shown) or by a server pool in a similar manner as a CRAN/vBBUP.

The RAN nodes 111 may be configured to communicate with one another via interface 112. The interface 112 may include a user plane interface for carrying user plane data between the RAN nodes 111, and a control plane interface for carrying control signaling between the RAN nodes 111. The interface 112 may be an X2 interface 112 when the system 100 is an LTE system, and the interface 112 may be an Xn interface 112 when the system 100 is a 5G/NR system. In some embodiments, interface 112 may be a wireless backhaul connection.

In embodiments, the UEs 101 can be configured to communicate using Orthogonal Frequency Division Multiplexing (OFDM) communication signals with each other or with any of the RAN nodes 111 over a multicarrier communication channel in accordance with various communication techniques, such as, but not limited to, an OFDMA communication technique (e.g., for DL communications) or a Single Carrier Frequency Division Multiple Access (SC-FDMA) communication technique (e.g., for UL and ProSe/SL communications), although the scope of the embodiments is not limited in this respect. The OFDM signals can comprise a plurality of orthogonal subcarriers.

DL and UL transmissions may be organized into frames with, for example, 10 ms durations, where each frame includes ten 1 ms subframes, and each subframe includes an integer number of slots. Time-frequency radio resource grids may be used to indicate physical resources in the DL or UL in corresponding slots. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. There is one resource grid for a given antenna port p, subcarrier spacing (SCS) configuration $\mu$, and transmission direction (DL or UL). The frequency location of a subcarrier refers to the center frequency of that subcarrier. Each element in the resource grid for antenna port p and SCS configuration $\mu$ is called a resource element (RE) and is uniquely identified by $(k, l)_{p,\mu}$ where k is the index in the frequency domain (e.g., k is a subcarrier index relative to a reference or reference point) and l refers to the symbol position in the time domain relative to some reference point (e.g., l is an OFDM symbol index relative to a reference or reference point). RE $(k, l)_{p,\mu}$ corresponds to a physical resource and the complex value $a_{k,l}^{(p,\mu)}$. In other words, $a_{k,l}^{(p,\mu)}$ is the value of RE (k, l) for antenna port p and SCS configuration µ. A collection of REs make up a resource block (RB), which is usually defined as $N_{sc}^{RB}=12$ consecutive subcarriers in the frequency domain. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

There are several different physical channels and physical signals that are conveyed using RBs, Physical RBs (PRBs), and/or individual REs. A physical channel corresponds to a set of REs carrying information originating from higher layers. Physical channels include physical UL channels (e.g., physical UL shared channel (PUSCH), physical UL control channel (PUCCH), physical random access channel (PRACH), etc.) and physical DL channels (e.g., physical DL shared channel (PDSCH), physical DL control channel (PDCCH), physical broadcast channel (PBCH), etc.). A physical signal is used by the physical layer (PHY) but does not carry information originating from higher layers. Physical signals include physical UL signals (e.g., Demodulation Reference Signal (DMRS), Phase-Tracking Reference Signal (PTRS), Sounding Reference Signal (SRS), etc.) and physical DL signals (e.g., DMRS, PTRS, Channel State Information Reference Signal (CSI-RS), Primary Synchronization Signal (PSS), Secondary Synchronization Signal (SSS), etc.). According to various embodiments, the physical DL signals and/or the physical UL signals further include the RIM-RS.

The RAN 110 is shown to be communicatively coupled to a core network (CN) 120 comprising one or more network elements 122, which are configured to offer various data and telecommunications services to customers/subscribers (e.g., users of UEs 101) who are connected to the CN 120 via the RAN 110. The term "network element" as used herein refers to physical or virtualized equipment and/or infrastructure used to provide wired or wireless communication network services, and may be considered synonymous with, and/or referred to as, a networked computer, networking hardware, network equipment, network node, router, switch, hub, bridge, radio network controller (RNC), RAN device, RAN node, gateway, server, cloud node, Virtualized Network Function (VNF), NFV Infrastructure (NFVI), and/or the like. The network elements 122 may be one or more server computer systems, which may implement various CN elements (e.g., network functions (NFs) and/or application functions (AFs)) such as those discussed herein. The components of the CN 120 may be implemented in one physical node or separate physical nodes including components to read and execute instructions from a machine-readable or computer-readable medium (e.g., a non-transitory machine-readable storage medium).

In embodiments where the CN 120 is a 5GC 120, the network elements 122 may implement one or more instances of an Authentication Server Function (AUSF), Access and Mobility Management Function (AMF), Session Management Function (SMF), Network Exposure Function (NEF), Policy Control Function (PCF), NF Repository Function (NRF), Unified Data Management (UDM) entity, AF, User Plane Function (UPF), Short Message Service Function (SMSF), Non-3GPP Interworking Function (N3IWF), Network Slice Selection Function (NSSF), and/or other like NR NFs. In such embodiments, the NG-RAN 110 may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a data network (DN) 130 via an IP interface 125. The DN 130 may represent one or more DNs including one or more Local Area DNs (LADNs), and may be an operator external public, a private PDN, an intra-operator PDN as discussed previously.

The CN 120 is shown to be communicatively coupled to PDN/DN 130 via an IP communications interface 125. The PDN/DN 130 may include one or more application servers (AS). The application server(s) (and the network element(s) 122) comprise one or more physical and/or virtualized systems for providing functionality (or services) to one or more clients (e.g., UEs 101) over a network.

Remote interference has been observed in commercial Time Division Duplex (TDD)-LTE networks with macrocell deployments where a relatively large number of eNBs intermittently suffered from deteriorating Interference-Over-Thermal (I-o-T), with values higher than −105 dBm, which may severely impact network coverage and successful connection rate. This kind of I-o-T degradation may be caused by the downlink (DL) signaling of remote eNBs as far as 300 km away due to atmospheric ducting. Atmospheric ducting is a mode of propagation of electromagnetic radiation, usually in the lower layers of Earth's atmosphere, where the waves are bent by atmospheric refraction. An example of this phenomenon is illustrated by atmospheric duct scenario 200B of FIG. 2. An atmospheric duct is a horizontal layer in the lower atmosphere in which the vertical refractive index gradients are such that radio signals are guided or ducted, tend to follow the curvature of the Earth, and experience less attenuation in the ducts than they would if the ducts (e.g., a higher refractive index layer) were not present. The duct acts as an atmospheric dielectric waveguide and limits the spread of the wavefront to only the horizontal dimension. Atmospheric duct interference (ADI) is often referred to as "remote interference,"

Figure 2:
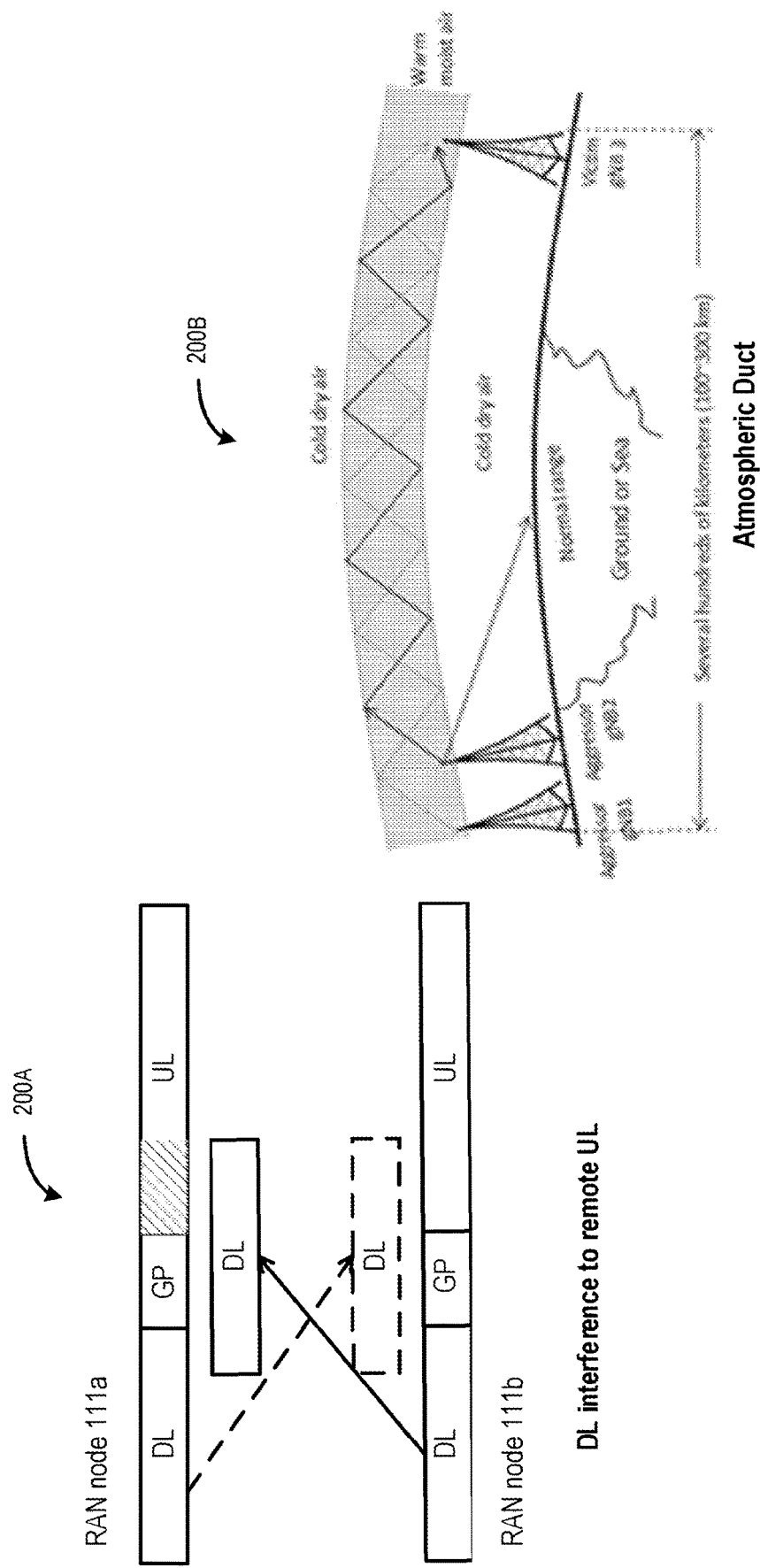
FIG. 2 illustrates an example scenario of atmospheric ducting with respect to embodiments of the present disclosure.

RIM may be used to alleviate the degradation suffered by the uplink (UL) channel due to remote interference caused by a remote DL channel, as is shown by scenario 200A of FIG. 2. For RIM schemes in which aggressors take some mitigation action, the aggressors need to be identified. Here, an "aggressor" refers to a network element (e.g., RAN node 111a) that interferes with another network element (e.g., RAN node 111b); the network element that is interfered with by an aggressor (e.g., RAN node 111b) is referred to as a "victim" or the like. To this end, embodiments include a reference signal (referred to as a RIM reference signal (RIM-RS)), which is used by a RAN node 111 (e.g., gNB) to measure inter-cell interference and to provide information about the experienced interference to other RAN nodes 111 (e.g., gNB). In embodiments, the RIM-RS is transmitted by the victim to assist aggressor(s) to recognize that they are causing remote interference to the victim. The RIM-RS can also be used by the aggressor(s) to estimate how many UL resources of the victim are impacted by the aggressor(s). As discussed in more detail infra, various embodiments of the RIM-RS are provided to accommodate different available BWs for different RAN nodes 111. According to various embodiments, up to two different types of RIM-RS can be configured including a first RIM-RS type that can be used to convey information, and a second RIM-RS type that depends on configuration only. Details regarding the reference sequence structure, time and frequency pattern, BW, and multiplexing of the RIM-RS are discussed infra.

Figure 3:
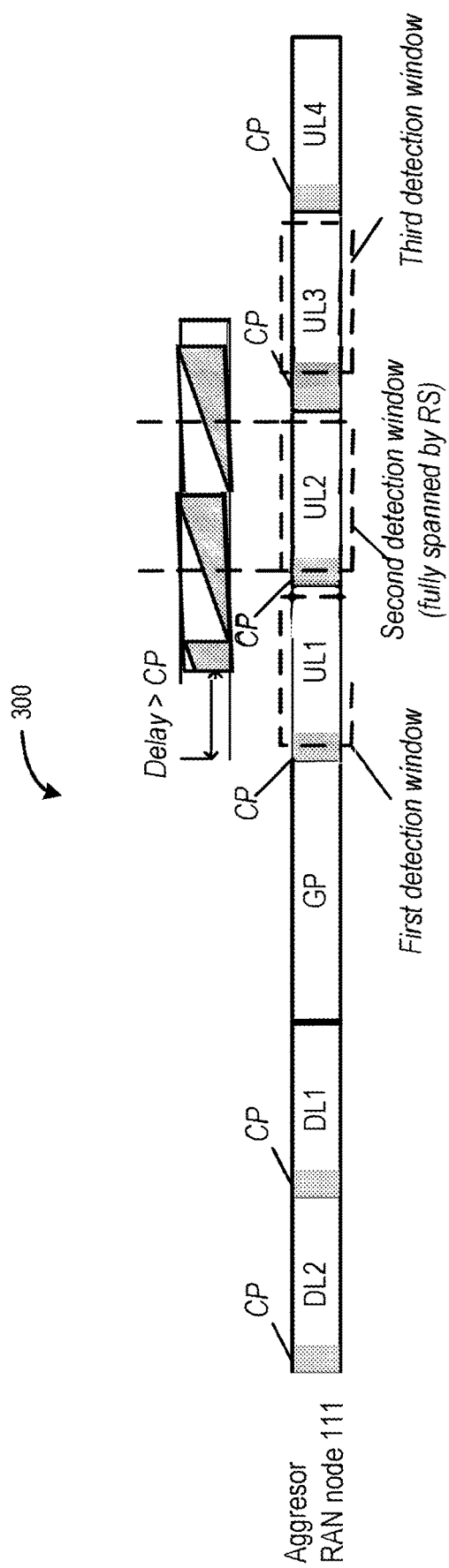
FIG. 3 illustrates an example remote interference management-reference signal (RIM-RS) structure according to various embodiments.

FIG. 3 shows an example RIM-RS structure 300 according to various embodiments. In various embodiments, the RIM-RS 300 includes a cyclic prefix (CP), multiple repetitions of a base time-domain sequence, and a gap period (GP) (sometimes referred to as a "guard period").

As the inter-RAN node channel in RIM scenarios is usually a single path channel, a normal CP may be used. For example, the CP may be 4.7 µs for a 15 kHz SCS (see e.g., Table 2 infra), or the CP may be 9.4 µs for a 15 kHz SCS or some other SCS. In the example of FIG. 3, the sequence is repeated twice and the total length of the RS is two symbols. In some embodiments, the base sequence may be slightly shorter than one symbol to provide enough room for the CP to be included in the symbol. For a detection window size equal to one symbol, the structure of the RIM-RS 300 insures that there is at least one detection window at the receiver that is fully spanned by the RS regardless of the delay. This RIM-RS structure 300 reduces detection complexity at the receiver because it requires cross-correlation on the symbol level and avoids performing cross-correlation at the sample level. The SCS for RIM-RS can be either the same as DL SCS or a fixed SCS independent of the DL SCS may be used.

Figure 4:
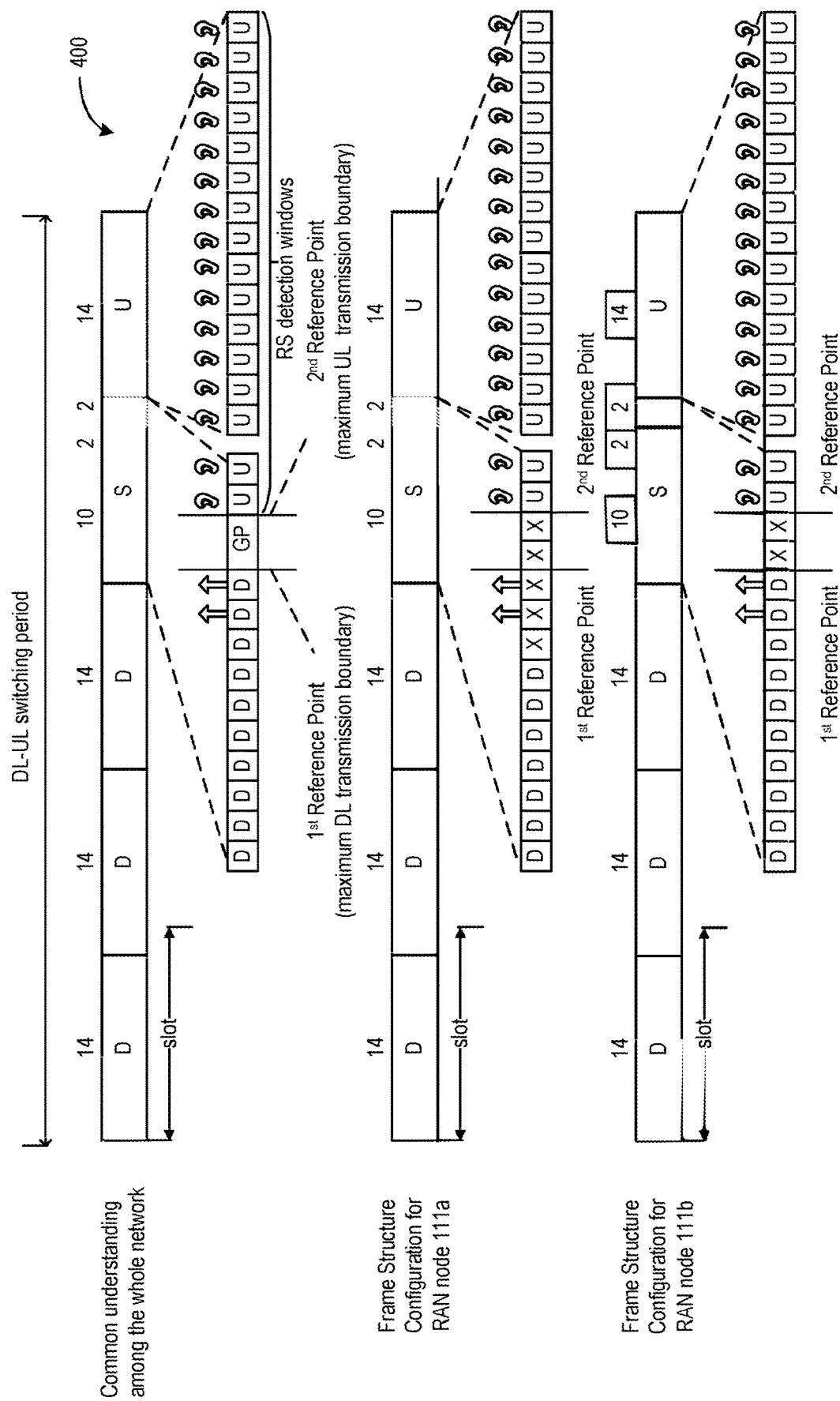
FIG. 4 illustrates an example of first and second reference points for RIM-RS time and frequency resource allocation according to various embodiments.

FIG. 4 shows a RIM-RS time and frequency resource allocation 400 according to various embodiments. In FIG. 4, resources labeled "D" are resources used for DL transmissions, and resources labelled with "U" refer to resources used for UL transmissions. In this example, each RAN node 111 has a DL boundary and an UL boundary. The DL boundary is a boundary between the DL time domain resources and the guard period (GP), and the UL boundary is a boundary between the GP and the UL time domain resources. In some embodiments, the GP for the RIM-RS may be different than the GP between the DL and UL in a TDD DL/UL period. The RAN nodes 111 (e.g., macrocell gNBs) in the network (e.g., system 100 of FIG. 1) may be synchronized and have a common understanding regarding DL transmission boundaries and UL transmission boundaries, which indicate the ending boundary of a corresponding DL transmission and a corresponding UL transmission, respectively. The common understanding for the DL transmission boundaries may be that the 1st reference point is the maximum/latest DL boundary across RAN nodes 111 in the network, and the common understanding for the UL transmission boundaries is that the 2nd reference point is the minimum/earliest UL boundary across all RAN nodes 111 in the network. In FIG. 4, the UL boundaries happen to coincide, however in other implementations, the UL boundaries may not be in alignment. In some embodiments, the CP may be 4.7 µs for a 15 kHz SCS. In other embodiments, the CP is twice as much, for example, 9.4 µs for a 15 kHz SCS.

In some embodiments, for the resource mapping of RIM-RS in the time domain, the RIM-RS location may be fixed to be right before the 1st reference point in FIG. 4. This may provide a fixed time reference for estimating the propagation delay between the aggressor RAN node 111a and the victim RAN nodes 111b, and estimating the number of semi-static UL symbols at the victim RAN node 111b that suffers from remote interference because of the aggressor RAN node 111a. Additionally, the RIM-RS can be mapped to consecutive subcarriers in the frequency domain.

With respect to RIM-RS BW length, because the RAN nodes 111 may be capable of operating a different BWs, the RIM-RS could be designed to fit the minimum system BW (e.g., 5 MHz) or designed to be configurable to accommodate different BW scenarios. Embodiments related to these different BW lengths are discussed infra with respect to FIG. 5.

Figure 5:
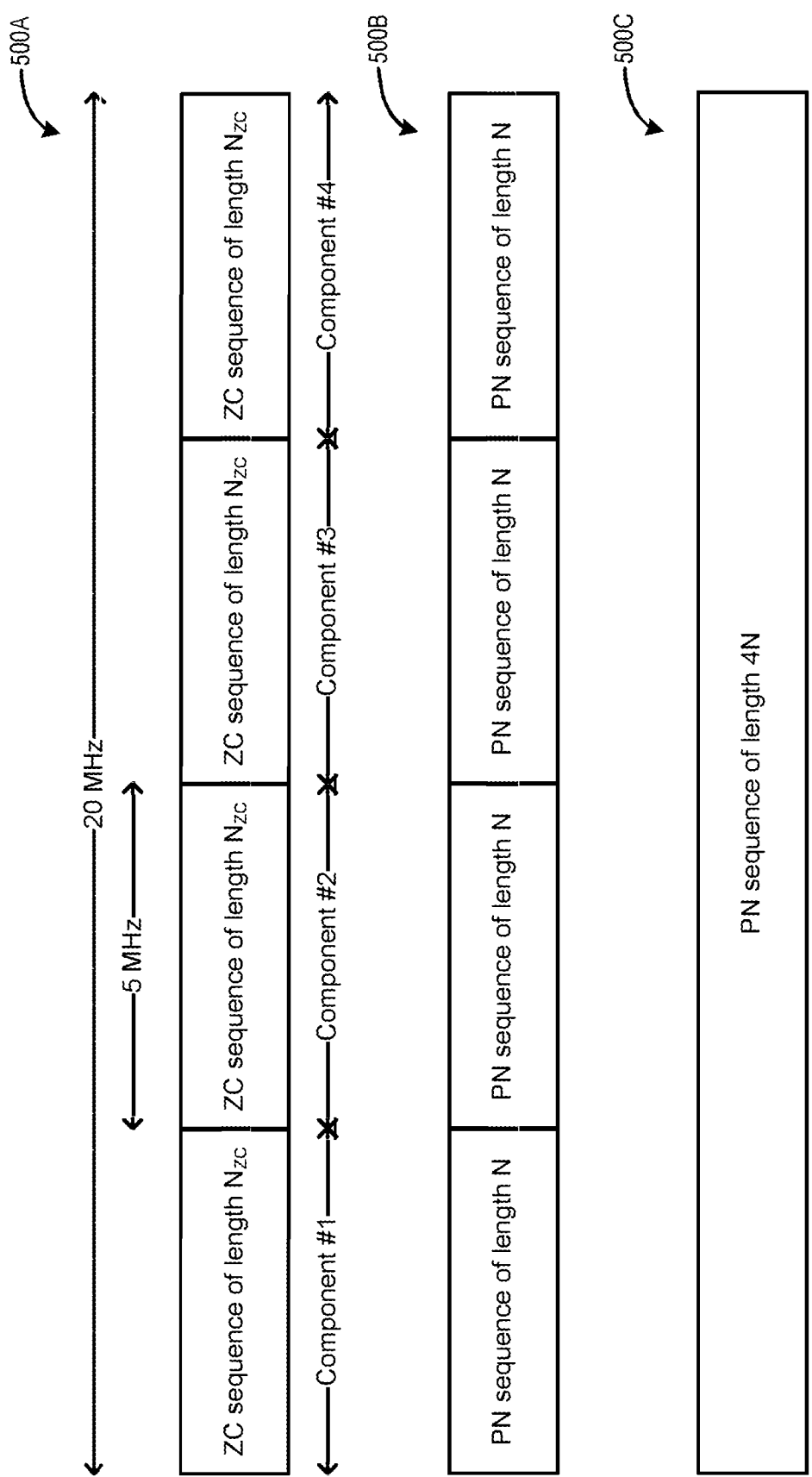
FIG. 5 illustrates an example RIM-RS sequence lengths and frequency multiplexing according to various embodiments.

FIG. 5 illustrates example RIM-RS sequence length and frequency multiplexing embodiments including Zadoff-Chu (ZC) sequences and pseudo-noise (PN) sequences (also referred to as "pseudo-random sequences" or the like). For RIM-RS 500A based on ZC sequences, a victim RAN node 111b constructs the RIM-RS 500A by multiplexing, in the frequency domain, multiple component sequences where each component sequence is a ZC sequence that has a length such that the ZC sequence fits within the minimum system BW. In some embodiments, the minimum system BW is 5 MHz. In some embodiments, each component (frequency domain) sequence (e.g., each ZC sequence) may be transformed into a corresponding time domain sequence.

In the ZC sequence embodiments, a component sequence of length $N_{ZC}$ and root index $u \in \{1, \ldots N_{ZC}-1\}$ is given by:

$$x_u(n) = \exp\left(-\frac{j\pi u n(n+1)}{N_{ZC}}\right), \qquad \text{(Equation 1)}$$

where $n=0, \ldots, N_{ZC}-1$, u is the root index, and the length $N_{ZC}$ is the largest prime number such that the sequence fits into the minimum system BW (see e.g., section 5.2.2.1 of TS 38.211 v15.3.0 (2018 Sep. 27)). Additionally, j is an imaginary unit/number such as the square root of −1 (e.g., $\sqrt{-1}$). For example, for 5 MHz minimum BW and 30 kHz SCS, there are 5000/30=166 subcarriers, and therefore, $N_{ZC}$ is chosen to be 127 and RIM-RS 500A may have 4 components as is shown by FIG. 5. In some embodiments, all of the component sequences can have the same root index. In other embodiments, some or all of the component sequences may have distinct root indexes according to some pre-determined rule or value.

In these embodiments, if an aggressor has a smaller BW than the transmitted victim RIM-RS, the aggressor may only use the component sequences that fall within its BW to detect the transmitted RIM-RS.

There may be two embodiments for RIM-RS based on PN sequences. In a first PN sequence embodiment, the victim RAN node 111b constructs an RIM-RS 500B by multiplexing, in the frequency domain, multiple component sequences where each component sequence is a Quadrature Phase Shift Keying (QPSK)-modulated sequence $r_L(n)$, defined infra, such that the length L fits within the minimum system BW. For example, for 20 MHz available BW, 5 MHz minimum BW and 30 kHz SCS, there are 5000/30=166 subcarriers in the minimum BW, and therefore, L can be chosen to be 128 and 4 component sequences can be used as is shown by RIM-RS 500B in FIG. 5.

In the second PN sequence embodiment, the victim RAN node 111 constructs a single RIM-RS 500C using the largest length of the QPSK-modulated sequence $r_1(n)$ that fits within its available BW. For example, for a 20 MHz available BW and 30 kHz SCS, there are 20000/30=666 subcarriers and the length L can be chosen to be 512.

For either PN-sequence embodiment, the reference signal (e.g., RIM-RS) sequence $r_L(n)$ of length L is given by:

$$r(n) = \frac{1}{\sqrt{2}}(1 - 2 \cdot c(2n)) + j\frac{1}{\sqrt{2}}(1 - 2 \cdot c(2n+1)), \quad \text{(Equation 2)}$$

where $r(n)=(n)$ and the PN sequence $c(n)$ is an order-31 (or length-31) Gold sequence of length $M_{PN}$, where $n=0, 1, \ldots, M_{PN}-1$, is defined by:

$$c(n)=(x_1(n+N_c)+x_2(n+N_c)) \bmod 2; \quad \text{(Equation 3)}$$

$$x_1(n+31)=(x_1(n+3)+x_1(n)) \bmod 2; \quad \text{(Equation 4)}$$

$$x_2(n+31)=(x_2(n+3)+x_2(n+2)+x_2(n+1)+x_2(n)) \bmod 2, \quad \text{(Equation 5)}$$

where $N_C=1600$ and the first m-sequence $x_1(n)$ is initialized with $x_1(0)=1$, $x_1(n)=0$, $n=1, 2, \ldots, 30$. In this example, the "c(2n)" and "c(2n+1)" in the reference signal sequence equation may refer to the PN sequence $c(n)$. The initialization of the second m-sequence $x_2(n)$ is denoted by $c_{init}=\Sigma_{i=0}^{30} x_2(i) \cdot 2^i$ with the value depending on the application of the sequence where $c_{init}$ is the initial condition or initial seed value for the second m-sequence $x_2(n)$. In embodiments, the initial condition (or application of the sequence) can be used to convey some information about the identity (ID) of the transmitter RAN node 111. In some embodiments, the length of the sequence $M_{PN}=2L$.

Alternatively for either PN sequence embodiment, the reference signal (e.g., RIM-RS) sequence $r(m)$ is given by:

$$r(m) = \frac{1}{\sqrt{2}}(1 - 2c(2m)) + j\frac{1}{\sqrt{2}}(1 - 2c(2m+1)), \quad \text{(Equation 6)}$$

where the pseudo-random sequence $c(m)$ (e.g., the "c(2m)" and "c(2m+1)" in the above equation) is defined in clause 5.2.1 of TS 38.211, and the pseudo-random sequence generator is to be initialized with:

$$c_{init}=(2^{10}f(n_t^{RIM})+n_{SCID}) \bmod 2^{31}, \quad \text{(Equation 7)}$$

where
- $n_{SCID}$ is a scrambling identity, where $n_{SCID} \in \{0, 1, \ldots, 2^{10}-1\}$ is obtained from an entry for resource index $i_s^{RIM}$ in a list of configured scrambling identities;
- $f(n_t^{RIM})=\Sigma_{i=0}^{20} 2^i \bar{c}(i)$ where the pseudo-random sequence $\bar{c}(i)$ is given by clause 5.2.1 of TS 38.211 v16.0.0, initialized with $\bar{c}_{init}(i)=(\gamma n_t^{RIM}+\delta) \bmod 2^{31}$ where the multiplier factory $\gamma \in \{0, 1, \ldots, 2^{31}-1\}$ and the offset $\delta \in \{0, 1, \ldots, 2^{31}-1\}$; and
- $n_t^{RIM}=\lfloor(t_{RS}^{RIM}-t_{ref}^{RIM})/T_{per}^{RIM}\rfloor$ is the number of RIM-RS transmission periods since $t_{ref}^{RIM}$ where $t_{RS}^{RIM}-t_{ref}^{RIM}$ is the time in seconds relative to $t_{ref}^{RIM}$ of 00:00:00 on 1 Jan. 1900, calculated as continuous time without leap second and traceable to a common time reference, and
- $T_{per}^{RIM}=N_{slot}^{P,t}/(1000 \cdot 2^\mu)$ is the RIM-RS transmission periodicity in seconds assuming that the first RIM-RS transmission period starts at $t_{ref}^{RIM}$, and where $N_{slot}^{P,t}$ is given below with reference to discussion about time-domain parameters and mapping from it to time-domain parameters.

For the first PN sequence embodiment, if an aggressor has a smaller BW than the transmitted victim RIM-RS, the aggressor may only use the component sequences that fall within its BW to detect the transmitted RIM-RS. For the second PN sequence embodiment, only the truncated portion of the sequence $r_L(n)$ (or $r(m)$) that fits within its BW may be used to detect the transmitted RIM-RS.

The RAN node 111 may transmit the RIM-RS repeatedly so long as the atmospheric duct interference exists. Therefore, in some embodiments the RIM-RS be may be configured with a transmission periodicity. The transmission periodicity of the RIM-RS may relate to a TDD DL/UL periodicity of the cells of the network. The TDD DL/UL periodicity in NR for frequency range 1 (FR1), which may correspond to frequencies from 450 MHz to 6000 MHz, is 0.5 milliseconds (ms), 1 ms, 1.25 ms (≥60 kHz SCS), 2 m, 2.5 ms (≥30 kHz SCS), 5 ms and 10 ms. Moreover, two concatenated TDD DL/UL patterns can be configured in the TDD DL/UL configuration such that 20 ms is a multiple of the combined periodicity. The concatenated pattern may have one or two switching points. To make RIM-RS transmission at fixed locations in each RIM-RS period, the RIM-RS transmission periodicity may be a multiple of the periodicity of the TDD DL/UL pattern (or the combined periodicity, if a plurality of TDD DL/UL patterns are configured), as shown in Table 1.

TABLE 1

RIM-RS transmission periodicity

| TDD DL/UL pattern periodicity (in ms) | RIM-RS transmission periodicity (m integer 2 ≥ 1) |
|---|---|
| 0.5 | 0.5*m |
| 1, 0.5 + 0.5 | 1*m |
| 2, 1 + 1 | 2*m |
| 1.25 | 1.25*m |
| 2.5, 1.25 + 1.25, 2 + 0.5 | 2.5*m |
| 5, 2.5 + 2.5 | 5*m |
| 10, 5 + 5 | 10*m |
| 10 + 10 | 20*m |

In some embodiments, the RIM-RS transmission periodicity is a multiple of the periodicity of the TDD DL/UL pattern, or a multiple of the combined periodicity, if a plurality of TDD DL/UL patterns are configured.

The rows of Table 1 that provide multiple TDD DL/UL pattern periodicities indicate possible concatenation of a plurality of TDD DL/UL patterns. For example, consider the row "10, 5+5." This indicates that a TDD DL/UL pattern may have a single 10 ms pattern, which includes one DL portion and one UL portion, or a concatenation of two 5 ms patterns, each of which may include different (or the same) distributions between the DL/UL portions. As used herein, the concatenated TDD patterns may also be referred to as sub-patterns to distinguish them from the incorporating TDD pattern. The incorporating TDD pattern may include a periodicity that is equal to the sum of the periodicities of the constituent sub-patterns.

Figure 6A:
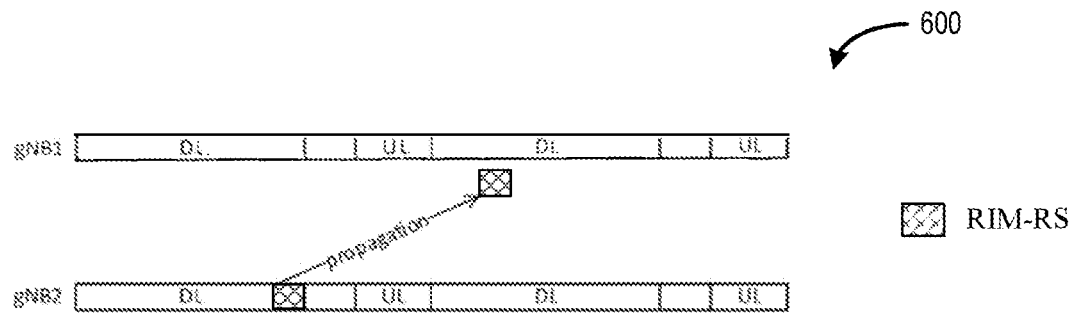
FIGS. 6a-6b illustrate transmission diagrams according to various embodiments.

FIG. 6a is a transmission diagram 600 that illustrates transmission and propagation of an RIM-RS with a TDD DL/UL pattern having a relatively long DL portion in accordance with some embodiments. Since the RIM-RS may be transmitted (by gNB2) at a DL boundary of a TDD DL/UL period, the RIM-RS may arrive (at gNB1) in the following TDD period to the one in which it was transmitted if the propagation delay is long. For example, for 1 ms TDD period with 0.7 ms DL, an RIM-RS transmitted by a gNB at 120 km from the receiver may arrive in the DL portion of the following TDD period. This may be problematic as gNB1 is not expected to receive a RIM-RS before the DL transmission boundary as it could potentially be transmitting and unable to listen to the received signal. This may not only be an issue for small TDD DL/UL periodicities but it could also be a problem for longer TDD DL/UL periodicities with long DL portion. The remote interference can be observed hundreds of kilometers away from the source: 100-150 km inland or 300-400 km near sea. Therefore, the total time of UL and X in a TDD DL/UL pattern need to be 0.5 ms (inland) and 1.33 ms (near sea) in order to be able to detect the RIM-RS within the aforementioned ranges. X may be considered flexible as it can been dynamically turned into a downlink or uplink on a slot-by-slot basis; but on a long-term basis it may simply be a gap.

Figure 6B:
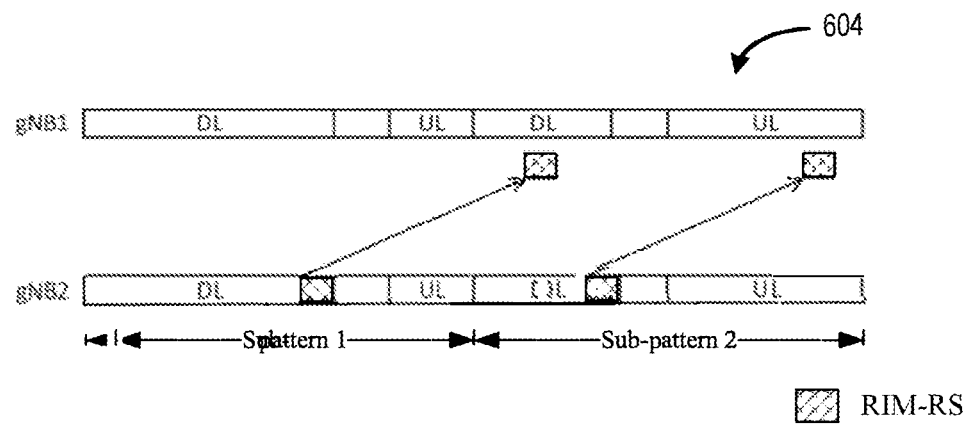

FIG. 6b is a transmission diagram 604 that illustrates transmission and propagation of an RIM-RS with a TDD DL/UL pattern that includes two concatenated TDD patterns. In some embodiments, it may be more desirable to transmit the RIM-RS at the DL boundary of the sub-pattern with a shorter DL since it may enable detection over a longer range. For example, in FIG. 6b, a RIM-RS transmitted at the switching point of sub-pattern 1 may not be heard at the receiver but the RIM-RS can be detected if it is transmitted at the switching point of sub-pattern 2. Therefore, it is desirable to make the time-location of the RIM-RS configurable instead of being always fixed, for example, at the first DL boundary. In some embodiments, the access nodes may be preconfigured (for example, preprogrammed) with the time location of the RIM-RS. However, in other embodiments this parameter may be dynamically configured. Similar concepts also apply to other parameters referred to as configurable parameters herein.

In some embodiments, the RIM-RS may be configured to be at a particular DL boundary, when the TDD UL/DL pattern includes a plurality of sub-patterns and, therefore, a plurality of DL boundaries. For example, if a pattern includes two TDD DL/UL sub-patterns, with each sub-pattern configured with a DL/UL switching point, the switching point to be used for RIM-RS transmission (such that the end of the RIM-RS aligns with the DL boundary) shall be configurable. In other embodiments, the RIM-RS may be configured to be at another location.

Figure 7:
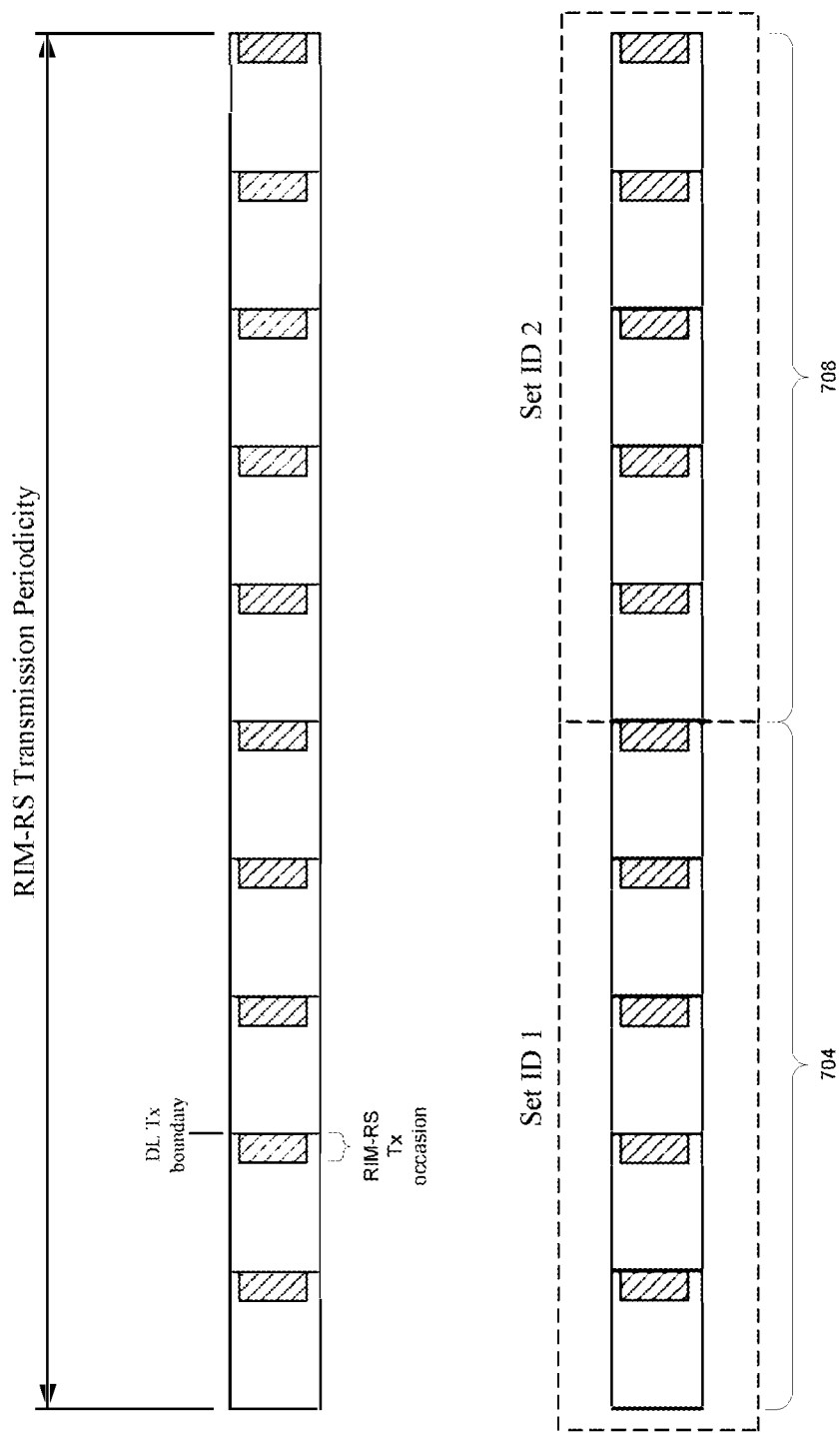
FIG. 7 illustrates RIM-RS time patterns in accordance with some embodiments.

FIG. 7 illustrates RIM-RS time patterns 700 in accordance with some embodiments. The patterns 700 may be used to boost performance of RIM-RS detection at a receiving RAN node. The patterns 700 illustrate multiple RIM-RS transmission occasions that may be used for time-domain repetition of the RIM-RS. The time-domain repetition of the RIM-RS may be done with a granularity of a TDD DL/UL period such that these repetitions correspond to the same set ID. For example, a RAN node may be configured to transmit a RIM-RS in one or more RIM-RS transmission occasions of a first time interval 704 of a RIM-RS transmission period based on a first set identifier (set ID 1), which may correspond to a first transmitter of the RAN node; and the RAN node may be configured to transmit a RIM-RS in one or more RIM-RS transmission occasions of a second time interval 708 of the RIM-RS transmission period based on a second set identifier (set ID 2), which may correspond to a second transmitter of the RAN node. In some embodiments, the first and second transmitters may be of different RAN nodes. In this manner, the sets of transmission occasions may be configured to distinguish RIM-RS resources or convey set identifier information. For example, an index of a RIM-RS transmission occasion within a RIM-RS transmission period may convey information about a set identifier of a transmitter. See also, resource indices ($i_r^{RIM}$, $i_f^{RIM}$, $i_s^{RIM}$) and set ID ($n_{setID}$) as discussed below with respect to mapping between resource triplet and set ID.

Use and value of the set IDs may be further illustrated by consideration of the following example. Consider a RAN node operating in a receiving mode for RIM-RS. The RAN node may continuously monitor for RIM-RS, for example, the RAN node may continuously attempt to detect a RIM-RS transmitted by other RAN nodes in every TDD DL/UL period (except when it is transmitting because, e.g., it cannot transmit and receive at the same time) within the RIM-RS transmission period. Each detection attempt may succeed or fail. If the detection attempt fails, then the receiving RAN node may conclude that there is no remote interference to itself from other transmitters/RAN nodes. If the detection succeeds, then the receiving RAN node may conclude that there is remote interference from some other RAN node and the receiving RAN node can extract (fully or partially) the set ID of the RAN node causing the interference based on the index of the TDD period (within the RIM-RS transmission period) in which the detection was successful. The extracted set ID may be saved in memory of the RAN node an provided to a network management node of a network operator.

For example, suppose that we have gNB1 (with set ID 1), gNB1 (with set ID 3), gNB3 (with set ID 3), and gNB4 (with set ID 4) where they are configured such that:
  gNB1 transmits in TDD period 1 and listens in other TDD periods;
  gNB2 transmits in TDD period 2 and listens in other TDD periods;
  gNB3 transmits in TDD period 3 and listens in other TDD periods; and
  gNB4 transmits in TDD period 4 and listens in other TDD periods.

Then, if gNB2 detects a RIM-RS successfully in TDD period 1, fails to detect a RIM-RS in TDD period 3 and detects a RIM-RS successfully in TDD period 4, then gNB2 may then conclude that: gNB1 and gNB4 are sources of remote interference to itself (gNB2), but gNB3 is not an interferer. A network operator may use this information to decide what adjustments should be made to mitigate interference. This information may be periodically provided to the managing node of the network or available upon a specific request.

Figure 8A:
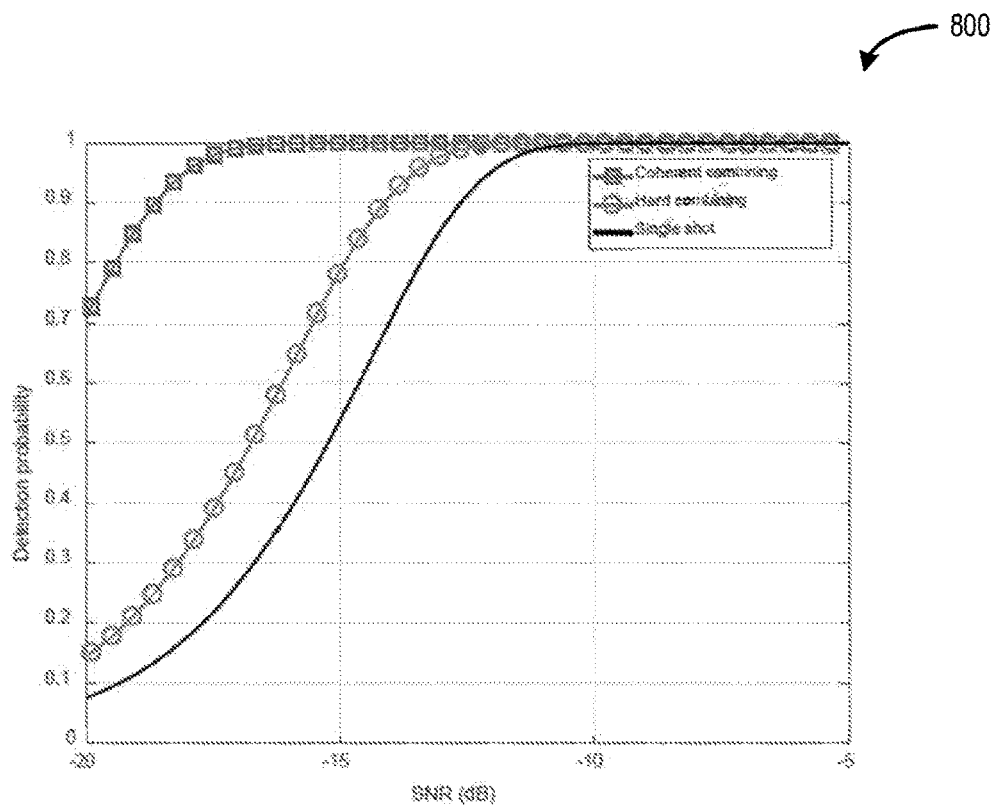
FIGS. 8a-8b show charts illustrating improvement of detection performance through repetition in accordance with some embodiments.
Figure 8B:
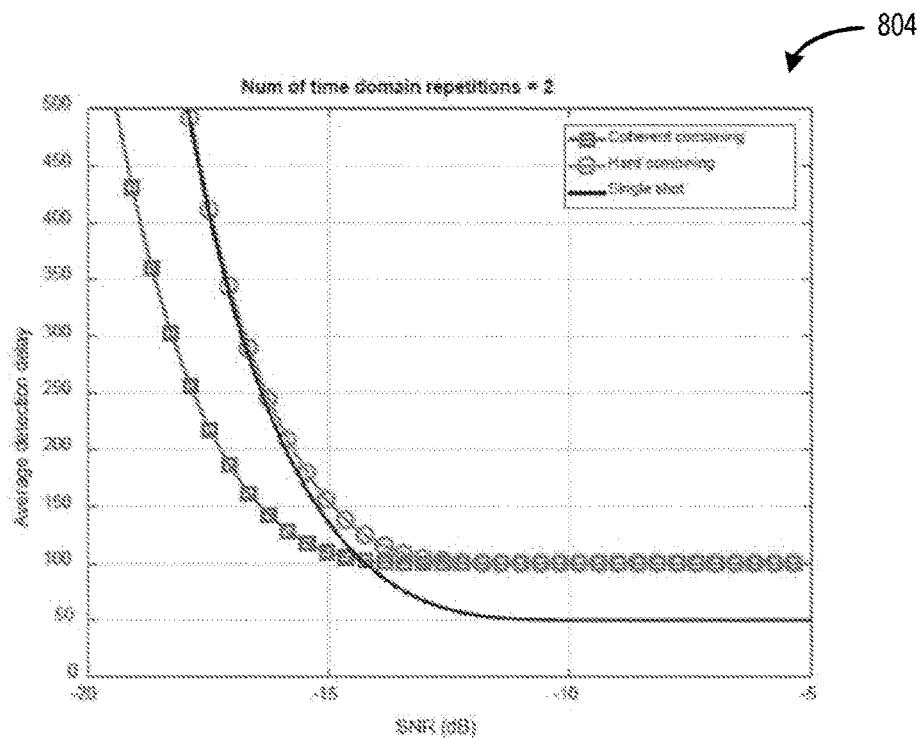

FIGS. 8a and 8b respectively show charts 800 and 804 that illustrate improvement of detection performance through repetition in accordance with some embodiments. The improvements may potentially come at a cost of longer average delay. On the one hand, (coherent) combining of multiple repetitions may decrease an average detection delay for weak RS. On the other hand, multiple repetitions may increase an average detection delay for a strong RS. Therefore, depending on an SNR distribution of the received RS, the average delay may decrease (if most of the signals are weak), increase (if most of the received signals are strong), or remain relatively unchanged (if there is a mix or weak and strong signals). This suggests that it may be desirable to have a configurable number of repetitions in time domain to suit the different network geometries. The configurable number of repetitions corresponds to the parameter R in the equations below, see, for example, Equation 16. Thus in some embodiments, the time-domain repetition within the RS transmission periodicity may be semi-statically configurable with TDD DL-UL transmission periodicity granularity.

Figure 9:
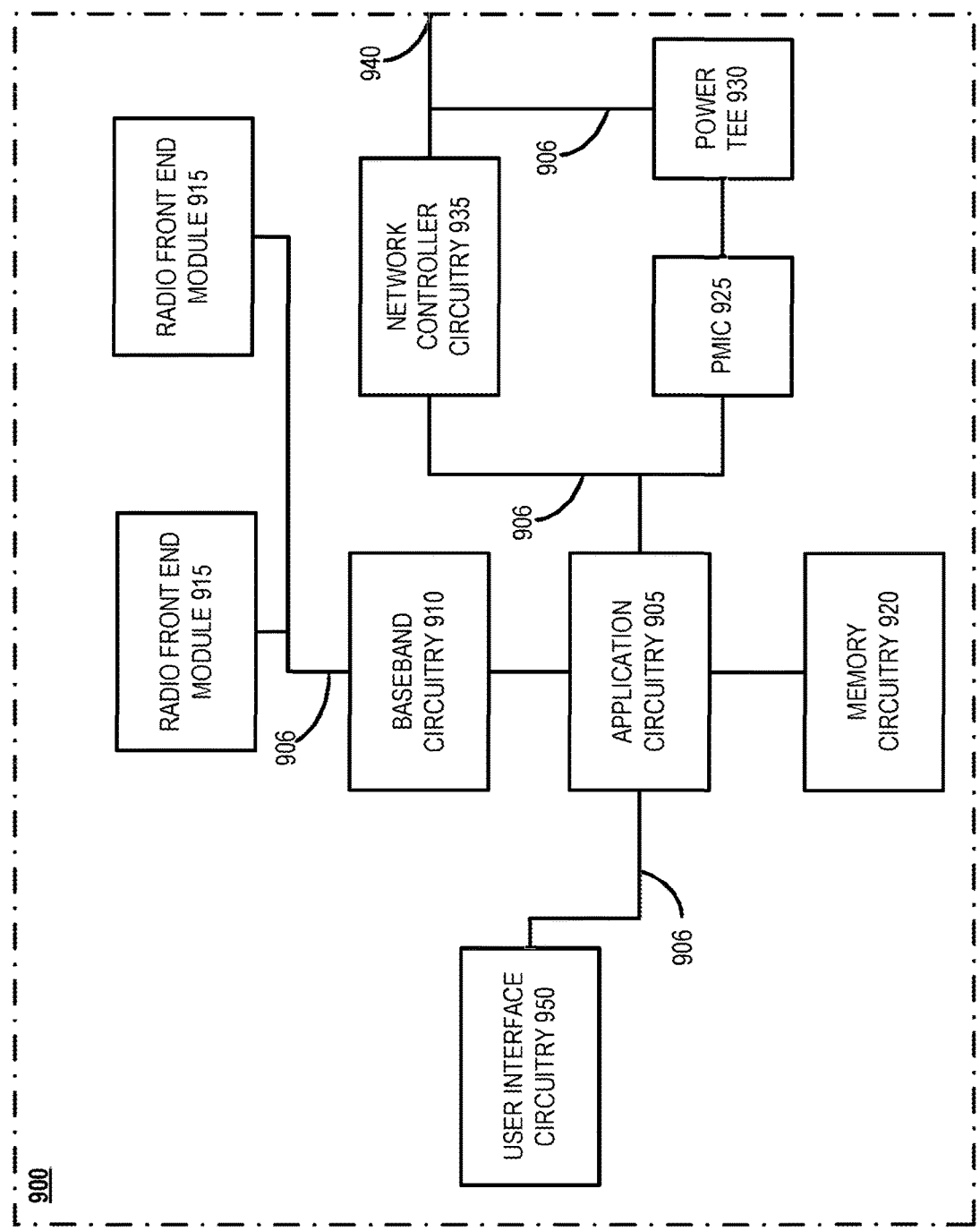
FIG. 9 illustrates an example of infrastructure equipment in accordance with various embodiments.
Figure 10:
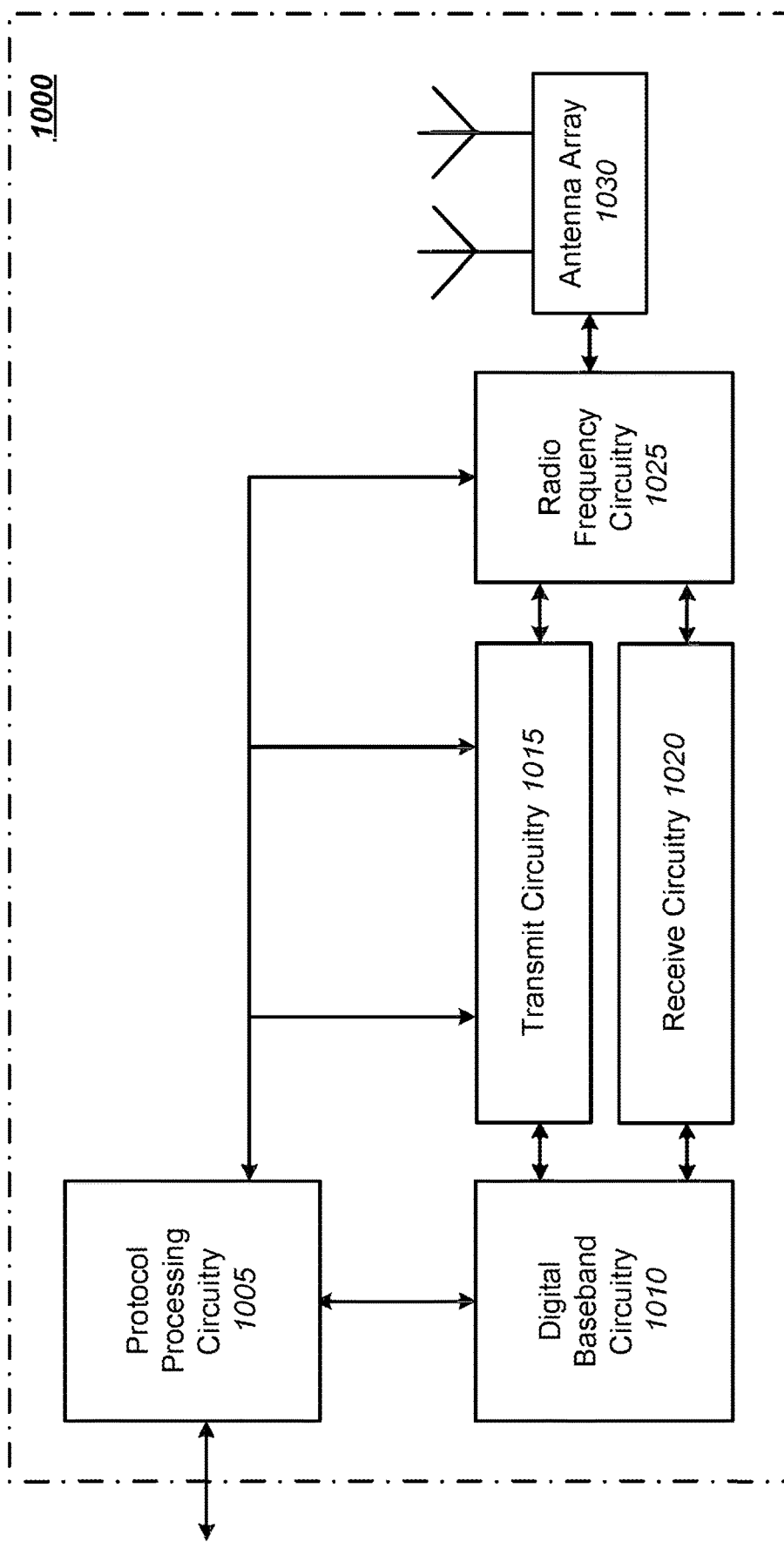
FIG. 10 illustrates an example of communication circuitry that may be used to practice the embodiments discussed herein.

Each of the UEs 101, RAN nodes 111, AP 106, network element(s) 122, application servers 130, and/or any other device or system discussed previously with respect to FIGS. 1-8 may include various hardware and/or software elements, such as those discussed infra with respect to FIGS. 9 and 10.

FIG. 9 illustrates an example of infrastructure equipment 900 in accordance with various embodiments. The infrastructure equipment 900 (or "system 900") may be implemented as a base station, radio head, RAN node such as the RAN nodes 111 or any other element/device discussed herein.

The system 900 includes application circuitry 905, baseband circuitry 910, one or more radio front end modules (RFEMs) 915, memory circuitry 920, power management integrated circuitry (PMIC) 925, power tee circuitry 930, network controller circuitry 935, network interface connector 940, and user interface 950. In some embodiments, the device 900 may include additional elements such as, for example, memory/storage, display, camera, sensor, or input/output (I/O) interface. In other embodiments, the components described below may be included in more than one device. The term "circuitry" as used herein refers to a circuit or system of multiple circuits configured to perform a particular function in an electronic device. The circuit or system of circuits may be part of, or include one or more hardware components, such as logic circuits, processor(s) (shared, dedicated, or group) and/or memory (shared, dedicated, or group), Integrated Circuits (ICs), Application-specific ICs (ASICs), Field Programmable Gate Arrays (FPGAs), Digital Signal Processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" as used herein refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. As used herein, the term "module" refers to one or more independent electronic circuits packaged onto a circuit board, FPGA, ASIC, SoC, SiP, etc., configured to provide a basic function within a computer system. A "module" may include a processor circuitry (shared, dedicated, or group) and/or memory circuitry shared, dedicated, or group), etc., that execute one or more software or firmware programs, a combinational logic circuit, and/or other suitable components that provide the described functionality. As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

Application circuitry 905 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 905 may be coupled with or may include memory/storage elements and may be configured to execute instructions stored in the memory/storage to enable various applications or operating systems to run on the system 900. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 905 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 905 may comprise, or may be, a special-purpose processor/controller to operate according to the various embodiments herein. As examples, the processor(s) of application circuitry 905 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 900 may not utilize application circuitry 905, and instead may include a special-purpose processor/controller to process IP data received from an EPC or 5GC, for example.

In some implementations, the application circuitry 905 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like.

The baseband circuitry 910 may be implemented, for example, as a solder-down substrate including one or more integrated circuits, a single packaged integrated circuit soldered to a main circuit board or a multi-chip module containing two or more integrated circuits. The baseband circuitry 910 includes one or more processing devices (e.g., baseband processors) to carry out various protocol and radio control functions. Baseband circuitry 910 may interface with application circuitry of system 900 for generation and processing of baseband signals and for controlling operations of the RFEMs 915. The baseband circuitry 910 may handle various radio control functions that enable communication with one or more radio networks via the RFEMs 915. The baseband circuitry 910 may include circuitry such as, but not limited to, one or more single-core or multi-core processors (e.g., one or more baseband processors) or control logic to process baseband signals received from a receive signal path of the RFEMs 915, and to generate baseband signals to be provided to the RFEMs 915 via a transmit signal path. In various embodiments, the baseband circuitry 910 may implement a RTOS to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

User interface circuitry 950 may include one or more user interfaces designed to enable user interaction with the system 900 or peripheral component interfaces designed to enable peripheral component interaction with the system 900. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 915 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 915, which incorporates both mmWave antennas and sub-mmWave.

The memory circuitry 920 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 920 may be implemented as one or more of solder down packaged integrated circuits, socketed memory modules and plug-in memory cards.

The PMIC 925 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 930 may provide for electrical power drawn from a network cable to provide both power supply and data connectivity to the infrastructure equipment 900 using a single cable.

The network controller circuitry 935 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 900 via network interface connector 940 using a physical connection, which may be electrical (commonly referred to as a "copper interconnect"), optical, or wireless. The network controller circuitry 935 may include one or more dedicated processors and/or FPGAs to communicate using one or more of the aforementioned protocols. In some implementations, the network controller circuitry 935 may include multiple controllers to provide connectivity to other networks using the same or different protocols.

The components shown by FIG. 9 may communicate with one another using interface circuitry 906 or IX 906, which may include any number of bus and/or IX technologies such as Industry Standard Architecture (ISA), extended ISA, inter-integrated circuit (I$^2$C), Serial Peripheral Interface (SPI), point-to-point interfaces, power management bus (PMBus), Peripheral Component Interconnect (PCI), PCI express (PCIe), PCI extended (PCIx), Intel® Ultra Path Interconnect (UPI), Intel® Accelerator Link (IAL), Coherent Accelerator Processor Interface (CAPI), OpenCAPI, Intel® QuickPath Interconnect (QPI), Intel® Omni-Path Architecture (OPA) IX, RapidIO™ system IXs, Cache Coherent Interconnect for Accelerators (CCIA), Gen-Z Consortium IXs, a HyperTransport interconnect, and/or any number of other IX technologies. The IX technology may be a proprietary bus, for example, used in an SoC based system.

FIG. 10 illustrates an example of communication circuitry 1000 that may be used to practice the embodiments discussed herein. Components as shown by FIG. 10 are shown for illustrative purposes and may include other components not shown by FIG. 10, or the elements shown by FIG. 10 may by alternatively be grouped according to functions.

The communication circuitry 1000 includes protocol processing circuitry 1005, which operates or implements various protocol layers/entities of one or more wireless communication protocols. In one example, the protocol processing circuitry 1005 may operate Long Term Evolution (LTE) protocol entities and/or Fifth Generation (5G)/New Radio (NR) protocol entities when the communication circuitry 1000 is a cellular radiofrequency communication system, such as millimeter wave (mmWave) communication circuitry or some other suitable cellular communication circuitry. In this example, the protocol processing circuitry 1005 would operate medium access control (MAC), radio link control (RLC), packet data convergence protocol (PDCP), service data adaptation protocol (SDAP), radio resource control (RRC), and non-access stratum (NAS) functions. In another example, the protocol processing circuitry 1005 may operate one or more IEEE-based protocols when the communication circuitry 1000 is WiFi communication system. In this example, the protocol processing circuitry 1005 would operate MAC and logical link control (LLC) functions.

The protocol processing circuitry 1005 may include one or more memory structures (not shown) to store program code and data information for operating the protocol functions, as well as one or more processing cores (not shown) to execute the program code and perform various operations using the data information. The protocol processing circuitry 1005 may include one or more instances of control circuitry (not shown) to provide control functions for the digital baseband circuitry 1010, transmit circuitry 1015, receive circuitry 1020, and/or radiofrequency (RF) circuitry 1025. In some embodiments, the protocol processing circuitry 1005 and/or the digital baseband circuitry 1010 correspond to the baseband circuitry 910 of FIG. 9.

The digital baseband circuitry 1010 may implement physical layer (PHY) functions including hybrid automatic repeat request (HARQ) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. The modulation/demodulation functionality may include Fast-Fourier Transform (FFT), precoding, or constellation mapping/demapping functionality. The encoding/decoding functionality may include convolution, tail-biting convolution, turbo, Viterbi, Low Density Parity Check (LDPC) coding, polar coding, etc. Embodiments of modulation/demodulation and encoder/decoder functionality are not limited to these examples and may include other suitable functionality in other embodiments.

Digital baseband processing circuitry 1010 and/or protocol processing circuitry 1005 may interface with an application platform (e.g., application circuitry 905 of FIG. 9) for generation and processing of baseband signals and for controlling operations of the RF circuitry 1025. The digital baseband circuitry 1010 may handle various radio control functions that enable communication with one or more radio networks via the RF circuitry 1025. The digital baseband circuitry 1010 may include circuitry such as, but not limited to, one or more single-core or multi-core processors (e.g., one or more baseband processors) or control logic to process baseband signals received from a receive signal path of the RF circuitry 1025 (e.g., via Rx circuitry 1020) and to generate baseband signals for a transmit signal path of the RF circuitry 1025 (e.g., via Tx circuitry 1015). The digital baseband circuitry 1010 may comprise a multiprotocol baseband processor or the like.

As mentioned previously, the digital baseband circuitry 1010 may include or implement encoder circuitry, which accepts input data, generates encoded data based on the input data, and outputs the encoded data to a modulation mapper. The encoder may also perform one or more of error detecting, error correcting, rate matching, and interleaving. The encoder may further include scrambling based on a scrambling sequence such as those discussed herein.

In various embodiments, the digital baseband circuitry 1010 may include or implement a sequence generator to generate, for example, low Peak to Average Power Ratio (low-PAPR) sequences (see e.g., section 5.2.2 of TS 38.211), pseudo-random noise (PN) sequences (see e.g., section 5.2.1 of TS 38.211), and/or reference signal sequences. In some embodiments, the sequence generator may be a part of the encoder circuitry. PN sequences are made up of bits (e.g., is and 0s) that are supposed to be random. The PN sequence generator may include linear feedback shift registers (LSFR) to generate the PN sequences. Scrambling codes based on Gold codes are used to scramble physical signals prior to transmission. The Gold codes are obtained by combining two PN sequences and performing modulo-2 addition or performing an exclusive OR (XOR) operation on the PN sequences. In embodiments, the sequence generator is used for QPSK modulation uses a pseudo-random Gold sequence, c(n), which is obtained by combining two M-sequences, $x_1$ and x2, of length 31, as described previously. In embodiments, the sequence generator generates RIM-RS sequences including the ZC sequences and the PN sequences discussed previously.

In various embodiments, the digital baseband circuitry 810 may include or implement a modulation mapper that takes binary digits as input (e.g., the encoded data from the encoder) and produces complex-valued modulation symbols as an output. As an example, for QPSK modulation, pairs of bits, b (2i), b(2i+1), are mapped to complex-valued modulation symbols d(i) according to:

$$d(i) = \frac{1}{\sqrt{2}}[(1 - 2b(2i)) + j(1 - 2b(2i + 1))]. \quad \text{(Equation 8)}$$

The modulation mapper may operate any other suitable modulation scheme, such as those discussed by section 5.1 of TS 38.211 v15.3.0. The modulation mapper may map groups containing one or more binary digits, selected from the encoded data, to complex valued modulation symbols according to one or more mapping tables.

In some embodiments, the complex-valued modulation symbols may be input to layer mapper to be mapped to one or more layer mapped modulation symbol streams. The one or more streams of layer mapped symbols may be input to precoder that generates one or more streams of precoded symbols, which may be represented as a block of vectors. The precoder may be configured to perform a direct mapping using a single antenna port, transmit diversity using space-time block coding, or spatial multiplexing. Each stream of precoded symbols may be input to a resource mapper that generates a stream of resource mapped symbols (e.g., resource elements). The resource mapper may map precoded symbols to frequency domain subcarriers and time domain symbols according to a mapping, which may include contiguous block mapping, randomized mapping, and/or sparse mapping according to a mapping code.

According to various embodiments, the modulation mapper (or resource mapper) maps the RIM-RS sequence to physical resources (also referred to as "RIM-RS resources"), which may occupy a number of resource blocks $N_{RB}^{RIM}$. In some embodiments, at most 32 RIM-RS resources can be configured within a 10 ms period. A resource for RIM-RS transmission is defined by resource indices including, a time resource index $i_t^{RIM}$, a frequency resource index $i_f^{RIM}$, and a sequence parameter resource index $i_s^{RIM}$, wherein $i_t^{RIM} \in \{0, 1, \ldots, P_t-1\}$, $i_f^{RIM} \in \{0, 1, \ldots, N_f^{RIM}-1\}$, and $i_s^{RIM} \in \{0, 1, \ldots, N_s^{RIM,i}-1\}$.

In various embodiments, the RIM-RS receiver assumes that the reference signal (e.g., the RIM-RS) being mapped to physical resources according to:

$$a_k^{(p,RIM)} = \beta_{RIM} r(k)$$

$$k=0,1,\ldots,L_{RIM}-1, \quad \text{(Equation 9)}$$

where $\beta_{RIM}$ is an amplitude scaling factor in order to control the RIM-RS transmission power and p is the antenna port. The starting position $l_0$ for RIM-RS type $i \in \{1, 2\}$ in slot $n_{s,f}^\mu$ in a frame is given by: $l_0 = T_{offset}^{UD,RIM}$ mod $N_{symb}^{slot}$ in slots satisfying:

$$(1024 N_{slot}^{frame,\mu} \bar{n}_f^{RIM} + N_{slot}^{frame,\mu} n_f^{RIM} + n_{s,f}^\mu - (T_{offset} \lfloor T_{offset}^{UD,RIM}/N_{symb}^{slot} \rfloor)) \mod N_{slot}^{P_t} = 0 \quad \text{(Equation 10)}$$

where $\bar{n}_f^{RIM} \in \{0, 1, \ldots N_{slot}^{P_t}/(1024 N_{slot}^{frame,\mu})-1\}$ counts the number of times the SFN periods within the RIM-RS transmission period; $T_{offset}^{ID,RIM}$ may be the parameter use to configure the time location within the TDD period and may be equal to $N_{ref}^{UD,RIM} - N_{symb,ref}^{RIM,i}$ where $N_{ref}^{UD,RIM} \in \{2, 3, \ldots, 20 \cdot 2 \cdot 14-1\}$ is the symbol offset of the reference point after the starting boundary of the uplink-downlink switching period in which the RIM-RS is mapped to and $N_{symb,ref}^{RIM,i}$ is obtained as described herein with respect to the time-domain parameters and mapping from it to time-domain parameters; $N_{slot}^{P_t}$ is the total number of slots in a RIM-RS transmission period as described herein with respect to the time-domain parameters and mapping from $i_t$ to time-domain parameters; $T_{offset}$ is the slot offset of the uplink-downlink switching period with index $i_t^{RIM}$ with respect to the starting boundary of the RIM-RS transmission period as described herein with respect to the time-domain parameters and mapping from $i_t$ to time-domain parameters; and $P_t$ is the RIM-RS transmission periodicity in units of uplink-downlink switching period as described herein with respect to the time-domain parameters and mapping from it to time-domain parameters.

Regarding RIM-RS configuration, in general, a resource for an RIM-RS transmission is defined by the indices $i_t^{RIM} \in \{0, 1, \ldots, P_t-1\}$, $i_f^{RIM} \in \{0, 1, \ldots N_f^{RIM}-1\}$, and $i_s^{RIM} \in \{0, 1, \ldots N_s^{RIM,i}-1\}$ used as indices into configured lists of time, frequency, and sequence parameters, respectively. All RIM-RS resources occupy the same number of resource blocks, $N_{RB}^{RIM}$. In some embodiments, at most 32 RIM-RS resources can be configured within a 10 ms period.

With respect to time-domain parameters and mapping from $i_t$ to time-domain parameters, RIM-RS are transmitted periodically with the RIM-RS transmission period $P_t$ defined in units of the uplink-downlink switching period determined from one or two configured uplink-downlink periods.

If a single uplink-downlink period is configured for RIM-RS purposes, $P_t$ is the RIM-RS transmission periodicity in terms of uplink-downlink switching periods given by $$P_t = \left\lceil \frac{2^\mu \overline{P}_t T_{per,1}^{RIM}}{1024 N_{slot}^{frame,\mu}} \right\rceil \left\lceil \frac{1024 N_{slot}^{frame,\mu}}{2^\mu T_{per,1}^{RIM}} \right\rceil, \quad \text{(Equation 11)}$$

where $T_{per,1}^{RIM} \in \{0.5, 0.625, 1, 1.25, 2, 2.5, 4, 5, 10, 20\}$ ms; $N_{slot}^{P_t} = 2^\mu P_t T_{per,1}^{RIM}$ is the total number of slots in a RIM-RS transmission period; and $T_{offset} = 2^\mu i_t^{RIM} T_{per,1}^{RIM}$ is the slot offset of the uplink-downlink switching period with index $i_t^{RIM}$ with respect to the starting boundary of the RIM-RS transmission period.

If two uplink-downlink periods are configured for RIM-RS purposes, $P_t$ is the RIM-RS transmission periodicity in terms of $P_t/2$ pairs of uplink-downlink switching periods and is given by $$P_t = \left\lceil \frac{2^\mu \overline{P}_t (T_{per,1}^{RIM} + T_{per,2}^{RIM})/2}{1024 N_{slot}^{frame,\mu}} \right\rceil \left\lceil \frac{1024 N_{slot}^{frame,\mu}}{2^\mu (T_{per,1}^{RIM} + T_{per,2}^{RIM})/2} \right\rceil, \quad \text{(Equation 12)}$$

where each pair consists of a first period of $T_{per,1}^{RIM} \in \{0.5, 0.625, 1, 1.25, 2, 2.5, 3, 4, 5, 10, 20\}$ ms and a second period of $T_{per,2}^{RIM} \in \{0.5, 0.625, 1, 1.25, 2, 2.5, 3, 4, 5, 10\}$ ms and where $T_{per,1}^{RIM} + T_{per,2}^{RIM}$ divides 20 ms; $N_{slot}^{P_t} = 2^\mu P_t (T_{per,1}^{RIM} + T_{per,2}^{RIM})/2$ is the total number of slots in a RIM-RS transmission period; and $T_{offset} = 2^\mu \lfloor i_t^{RIM}/2 \rfloor (T_{per,1}^{RIM} + T_{per,2}^{RIM}) + 2^\mu (i_t^{RIM} \mod 2) T_{per,1}^{RIM}$ is the slot offset of the uplink- downlink switching period with index $i_t^{RIM}$ with respect to the starting boundary of the RIM-RS transmission period. The intermediate quantity $\overline{P}_t$ is given by:

$$\overline{P}_t = \begin{cases} \left\lceil \frac{N_{setID}^{RIM,1}}{N_f^{RIM} N_s^{RIM,1}} \right\rceil R_1 + & \text{if EnoughIndication is} \\ \left\lceil \frac{N_{setID}^{RIM,2}}{N_f^{RIM} N_s^{RIM,2}} \right\rceil R_2 & \text{disabled} \\ \left\lceil \frac{2 N_{setID}^{RIM,1}}{N_f^{RIM} N_s^{RIM,1}} \right\rceil R_1 + & \text{if EnoughIndication is} \\ \left\lceil \frac{N_{setID}^{RIM,2}}{N_f^{RIM} N_s^{RIM,2}} \right\rceil R_2 & \text{enabled} \end{cases} \quad \text{(Equation 13)}$$

where $N_{setID}^{RIM,1}$ and $N_{setID}^{RIM,2}$ are the total number of setIDs for RIM-RS type 1 and RIM-RS type 2, respectively; $N_f^{RIM} \in \{1, 2, 4\}$ is the number of candidate frequency resources configured in the network; $N_s^{RIM,i} \in \{1, 2, \ldots, 8\}$ is the number of candidate sequences assigned for RIM-RS type $i \in \{1,2\}$ in the network; and $R_1$ and $R_2$ are the number of consecutive uplink-downlink switching periods for RIM-RS type 1 and RIM-RS type 2, respectively. If near-far functionality is not configured, $R_i \in \{1, 2, 4\}$, otherwise $R_i \in \{2, 4, 8\}$ and the first and second half of the $R_i$ consecutive uplink-downlink switching periods are for near functionality and far functionality, respectively.

The quantity $N_{symb,ref}^{RIM,i}$ is obtained from entry f in a list of configured symbol offsets for RIM-RS i.

For frequency-domain parameters and mapping from $i_f$ to frequency-domain parameters, the frequency-domain parameter $k_1$, described herein with respect to OFDM baseband signal generation for RIM-RS, may be the frequency offset relative to a configured reference point for RIM-RS and may be obtained from entry $i_f^{RIM}$ in a list of configured frequency offsets expressed in units of resource blocks. The number of candidate frequency resources configured in the network, $N_f^{RIM}$, may fulfill the following:

$$N_f^{RIM} \leq \left\lfloor \frac{N_{grid}^{size,\mu} N_{RB}^{sc} \cdot 2^\mu \cdot 15}{40 \cdot 10^3} \right\rfloor + \left\lfloor \frac{N_{grid}^{size,\mu} N_{RB}^{sc} \cdot 2^\mu \cdot 15}{80 \cdot 10^3} \right\rfloor + 1, \quad \text{(Equation 14)}$$

where $N_{RB}^{sc}$ may be the number of subcarriers per resource block (e.g., $N_{RB}^{sc} = N_{sc}^{RB}$; see e.g., clause 4.4.4.1 of 38.211; and $N_{grid}^{size,\mu}$ is a carrier BW for SCS configuration $\mu$ and may be directly configured to the access nodes. If $N_f^{RIM} > 1$, the frequency difference between any pair of configured frequency offsets in the list is not smaller than $N_{RB}^{RIM}$ (the number of RBs for RIM-RS). The number of RBs for RIM-RS is given by:

$$N_{RB}^{RIM} = \min(96, N_{grid,DL}^{size,\mu}) \quad \text{for } \mu = 0 \quad \text{(Equation 15)}$$
$$N_{RB}^{RIM} \in \{\min(48, N_{grid,DL}^{size,\mu}), \min(96, N_{grid,DL}^{size,\mu})\} \quad \text{for } \mu = 1,$$

where $N_{grid,DL}^{size,\mu}$ is the size of the DL resource grid (see e.g., clauses 4.4.2 and 5.3 of TS 38.211).

The sequence parameters and mapping from $i_s$ to sequence parameters involves obtaining the scrambling identity $n_{SCID}$ (see e.g., discussion herein regarding time-domain parameters and mapping from it to time-domain parameters) from entry $i_s^{RIM}$ in a list of configured scrambling identities.

Mapping between resource triplet and set ID involves determining the resource indices $i_t^{RIM}$, $i_f^{RIM}$, and $i_s^{RIM}$ from the index f in the set ID $n_{setID}$ according to:

$$i_t^{RIM} = T_{start} + \left(\left\lfloor \frac{n_{setID}}{N_s^{RIM}} \right\rfloor \mod N_t^{RIM}\right) R + \bar{r}; \quad \text{(Equation 16)}$$

$$i_f^{RIM} = \left(\left\lfloor \frac{n_{setID}}{N_t^{RIM} N_s^{RIM}} \right\rfloor \mod N_f^{RIM}\right); \text{ and} \quad \text{(Equation 17)}$$

$$i_s^{RIM} = S_{start} + \left(n_{setID} \mod N_s^{RIM}\right), \quad \text{(Equation 18)}$$

where $N_t^{RIM}$ is given by:

$$N_t^{RIM} = \begin{cases} \left\lceil \frac{N_{setID}^{RIM,1}}{N_f^{RIM} N_s^{RIM,1}} \right\rceil & \text{for } RIM-RS \text{ type 1 and} \\ & \text{if } EnoughIndication \text{ is disabled} \\ \left\lceil \frac{2N_{setID}^{RIM,1}}{N_f^{RIM} N_s^{RIM,1}} \right\rceil & \text{for } RIM-RS \text{ type 1 and} \\ & \text{if } EnoughIndication \text{ is enabled} \\ \left\lceil \frac{N_{setID}^{RIM,2}}{N_f^{RIM} N_s^{RIM,2}} \right\rceil & \text{for } RIM-RS \text{ type 2} \end{cases} \quad \text{(Equation 19)}$$

where $N_f^{RIM} \in \{1, 2, 4\}$ is the number of candidate frequency resources configured in the network; $N_s^{RIM}$ is the number of sequence candidates for the current RIM-RS resource given by:

$$N_s^{RIM} = \begin{cases} N_s^{RIM,1} & \text{for } RIM-RS \text{ type 1 and if} \\ & EnoughIndication \text{ is disabled} \\ N_s^{RIM,1}/2 & \text{for } RIM-RS \text{ type 1 and if }, \\ & EnoughIndication \text{ is enabled} \\ N_s^{RIM,2} & \text{for } RIM-RS \text{ type 2} \end{cases} \quad \text{(Equation 20)}$$

$T_{start}$ is the starting time offset given by:

$$T_{start} = \begin{cases} 0 & \text{for } RIM-RS \text{ type 1} \\ \left\lceil \frac{N_{setID}^{RIM,1}}{N_f^{RIM} N_s^{RIM,1}} \right\rceil R_1 & \text{for } RIM-RS \text{ type 2 and if} \\ & EnoughIndication \text{ is disabled} \\ \left\lceil \frac{2N_{setID}^{RIM,1}}{N_f^{RIM} N_s^{RIM,1}} \right\rceil R_1 & \text{for } RIM-RS \text{ type 2 and if} \\ & EnoughIndication \text{ is enabled} \end{cases} \quad \text{(Equation 21)}$$

where $S_{start}$ is given by: $S_{start} = \begin{cases} N_s^{RIM,1}/2 \\ 0 \end{cases}$ if EnoughIndication is enabled and 'enough mitigation' is to be indicated otherwise where $N_s^{RIM,1}$ is the number of candidate sequences assigned for RIM-RS type 1; $\bar{r} \in \{0, 1, \ldots, R_i-1\}$ where $R_i$ is the number of consecutive uplink-downlink periods for RIM-RS type i as described herein with respect to the time-domain parameters and mapping from $i_t$ to time-domain parameters; and the set ID is determined from the resource triplet according to:

$$n_{setID} = \left(i_s^{RIM} - S_{start}\right) + N_s^{RIM} \left\lfloor \frac{i_t^{RIM} - T_{start}}{R_i} \right\rfloor + N_t^{RIM} N_s^{RIM} i_f^{RIM}. \quad \text{(Equation 22)}$$

In various embodiments, the digital baseband circuitry 1010 includes or implements a baseband signal generator (also referred to as a "multicarrier generator") to generate OFDM baseband signals and/or other like baseband signals. In these embodiments, the resource mapped symbols from the resource mapper are input to the baseband signal generator which generates time domain baseband symbol(s).

The baseband signal generator may generate a time domain signal (e.g., a set of time domain symbols) using, for example, an inverse discrete Fourier transform, commonly implemented as an inverse fast Fourier transform (IFFT) or a filter bank comprising one or more filters. The time-domain signal that results from the IFFT is transmitted across the radio channel. At the receiver, an FFT block is used to process the received signal and bring it into the frequency domain which is used to recover the original data bits.

According to various embodiments, OFDM baseband signal generation for RIM-RS is as follows: The time-continuous signal $s_l^{(p,\mu)}(t)$ on antenna port p for RIM-RS is defined by:

$$s_l^{(p,\mu)}(t) = \sum_{k=0}^{L_{RIM}-1} a_k^{(p,RIM)} e^{j2\pi(k+k_1)\Delta f_{RIM}\left(t-N_{CP}^{RIM}T_c-t_{start,l_0}^{\mu}\right)}, \quad \text{(Equation 23)}$$

where $$t_{start,l_0}^{RIM} \leq t < t_{start,l_0}^{RIM} + \left(N_u^{RIM}+N_{CP}^{RIM}\right)T_c, \quad \text{(Equation 24)}$$

$$N_u^{RIM} = 2 \cdot 2048\kappa \cdot 2^{-\mu}, \quad \text{(Equation 25)=}$$

$$N_{CP}^{RIM} = N_{CP,l_0}^{RIM} + N_{CP,l}^{RIM}, \quad \text{(Equation 26)}$$

$$\bar{l} = \begin{cases} 0 & \text{if } l_0 = N_{symb}^{slot} - 1 \\ l_0 + 1 & \text{otherwise} \end{cases}, \quad \text{(Equation 27)}$$

and where $a_k^{(p,RIM)}$ is/are the resource mapped symbols, k is a subcarrier index, µ is the SCS configuration; $N_{symb}^{slot}$ is the number of symbols per slot; $\Delta f_{RIM}$ is the SCS for RIM-RS and $\Delta f_{RIM}=15 \cdot 2^\mu$ kHz where $\mu \in \{0, 1\}$ is the SCS configuration for the RIM-RS (see e.g., Table 2 infra); $k_1$ is the starting frequency offset of the RIM-RS as descried herein with respect to the frequency-domain parameters and mapping from $i_f$ to frequency domain parameters; $L_{RIM}=12N_{RB}^{RIM}$ is the length of the RIM-RS sequence where $N_{RB}^{RIM}$ is the BW of the RIM-RS in RBs; $l_0$ is the starting symbol as discussed herein with respect to mapping to physical resources; $t_{start,l_0}^{RIM}=t_{start,l}^{\mu}$ is given by clause 5.3.1 of TS 38.211 and discussed elsewhere herein with $l=l_0$; and $N_{CP,l_0}^{RIM}=N_{CP,l}^{\mu}$ is given by clause 5.3.1 of TS 38.211 and discussed elsewhere herein with $l=l_0$ where $N_{CP,l}^{\mu}$ is the CP length for SCS configuration µ and OFDM symbol l, where $l \in \{0, 1 \ldots N_{slot}^{subframe,\mu} N_{symb}^{slot}-1\}$, and $$N_{CP,l}^{\mu} = \begin{cases} 512\kappa \cdot 2^{-\mu} & \text{extended cyclic prefix} \\ 144\kappa \cdot 2^{-\mu} + 16\kappa & \text{normal cyclic prefix,} \\ & l = 0 \text{ or } l = 7 \cdot 2^{\mu} \\ 144\kappa \cdot 2^{-\mu} & \text{normal cyclic prefix,} \\ & l \neq 0 \text{ or } l \neq 7 \cdot 2^{\mu} \end{cases} \quad \text{(Equation 28)}$$

The starting position of OFDM symbol l for SCS configuration µ in a subframe is given by $$t_{start,l}^{\mu} = \begin{cases} 0 \\ t_{start,l-1}^{\mu} + \left(N_u^{\mu} + N_{CP,l-1}^{\mu}\right) \cdot T_c \end{cases}$$

TABLE 2

Supported transmission numerologies

| μ | Δf = 2^μ · 15 [kHz] | Cyclic Prefix |
|---|---|---|
| 0 | 15 | Normal |
| 1 | 30 | Normal |
| 2 | 60 | Normal, Extended |
| 3 | 120 | Normal |
| 4 | 240 | Normal |

Multiple OFDM numerologies are supported as given by Table 2 where Δf is the SCS, and where μ and the CP for a BWP may be directly configured to the access nodes. In Table 2, the normal CP refers to a CP duration of 4.7 microseconds (μs) (or 5.2 ρs) and seven symbols per slot, and the extended CP refers to a CP duration of 16.67 ρs and 6 symbols per slot.

In various embodiments, the digital baseband circuitry 1010 includes or implements RIM-RS detection circuitry, wherein the digital baseband circuitry 1010 monitors (or attempts to detect) one or more RIM-RS candidates in one or more (pre)configured RIM-RS monitoring occasions. The RIM-RS monitoring occasions may be based on the RIM-RS time and frequency resource allocation 400 of FIG. 4, the RIM-RS resource mapping embodiments discussed previously, and/or the RIM-RS configuration embodiments discussed previously.

The communication circuitry 1000 also includes transmit (Tx) circuitry 1015 and receive (Rx) circuitry 1020. The Tx circuitry 1015 is configured to convert digital baseband signals into analog signals for transmission by the RF circuitry 1025. To do so, in one embodiment, the Tx circuitry 1015 includes various components, such as digital to analog converters (DACs), analog baseband circuitry, up-conversion circuitry, and filtering and amplification circuitry. In another embodiment, the Tx circuitry 1015 may include digital transmit circuitry and output circuitry.

The Rx circuitry 1020 is configured to convert analog signals received by the RF circuitry 1025 into digital baseband signals to be provided to the digital baseband circuitry 1010. To do so, in one embodiment, the Rx circuitry 1020 includes parallel receive circuitry and/or one or more instances of combined receive circuitry. The parallel receive circuitry and instances of the combined receive circuitry may include Intermediate Frequency (IF) down-conversion circuitry, IF processing circuitry, baseband down-conversion circuitry, baseband processing circuitry, and analog-to-digital converter (ADC) circuitry.

The communication circuitry 1000 also includes radiofrequency (RF) circuitry 1025 to enable communication with wireless networks using modulated electromagnetic radiation through a non-solid medium. The RF circuitry 1025 includes a receive signal path, which may include circuitry to convert analog RF signals (e.g., an existing or received modulated waveform) into digital baseband signals to be provided to the digital baseband circuitry 1010 via the Rx circuitry 1020. The RF circuitry 1025 also includes a transmit signal path, which may include circuitry configured to convert digital baseband signals provided by the digital baseband circuitry 1010 via the Tx circuitry 1015 to be converted into analog RF signals (e.g., modulated waveform) that will be amplified and transmitted via the antenna array 1030.

In various embodiments, RIM-RS modulation (e.g., provided by the RF circuitry 1025) and up-conversion (e.g., provided by the Tx circuitry 1015) to a carrier frequency $f_0$ of the complex-valued OFDM baseband signal for antenna port p, SCS configuration μ, and OFDM symbol υ in a subframe assumed to start at t=0 is given by:

$$Re\left\{ s_l^{(p,\mu)}(t) e^{j2\pi f_0^{RIM}\left(t - t_{start,l_0}^{\mu} - N_{CP}^{RIM} T_c\right)} \right\}$$

where $f_0^{RIM}$ is the configured reference point for RIM-RS.

RF circuitry 1025 may include one or more instances of radio chain circuitry, which may include one or more filters, power amplifiers, low noise amplifiers, programmable phase shifters, and power supplies (not shown). RF circuitry 1025 may also include power combining and dividing circuitry. The power combining and dividing circuitry may operate bidirectionally, such that the same physical circuitry may be configured to operate as a power divider when the device is transmitting, and as a power combiner when the device is receiving. In some embodiments, the power combining and dividing circuitry may include wholly or partially separate circuitries to perform power dividing when the device is transmitting and power combining when the device is receiving. The power combining and dividing circuitry may include passive circuitry comprising one or more two-way power divider/combiners arranged in a tree. In some embodiments, the power combining and dividing circuitry may include active circuitry comprising amplifier circuits.

The communication circuitry 1000 also includes antenna array 1030. The antenna array 1030 include one or more antenna elements. The antenna array 1030 may be a plurality of microstrip antennas or printed antennas that are fabricated on the surface of one or more printed circuit boards. The antenna array 1030 may be formed in as a patch of metal foil (e.g., a patch antenna) in a variety of shapes, and may be coupled with the RF circuitry 1025 using metal transmission lines or the like.

Figure 11:
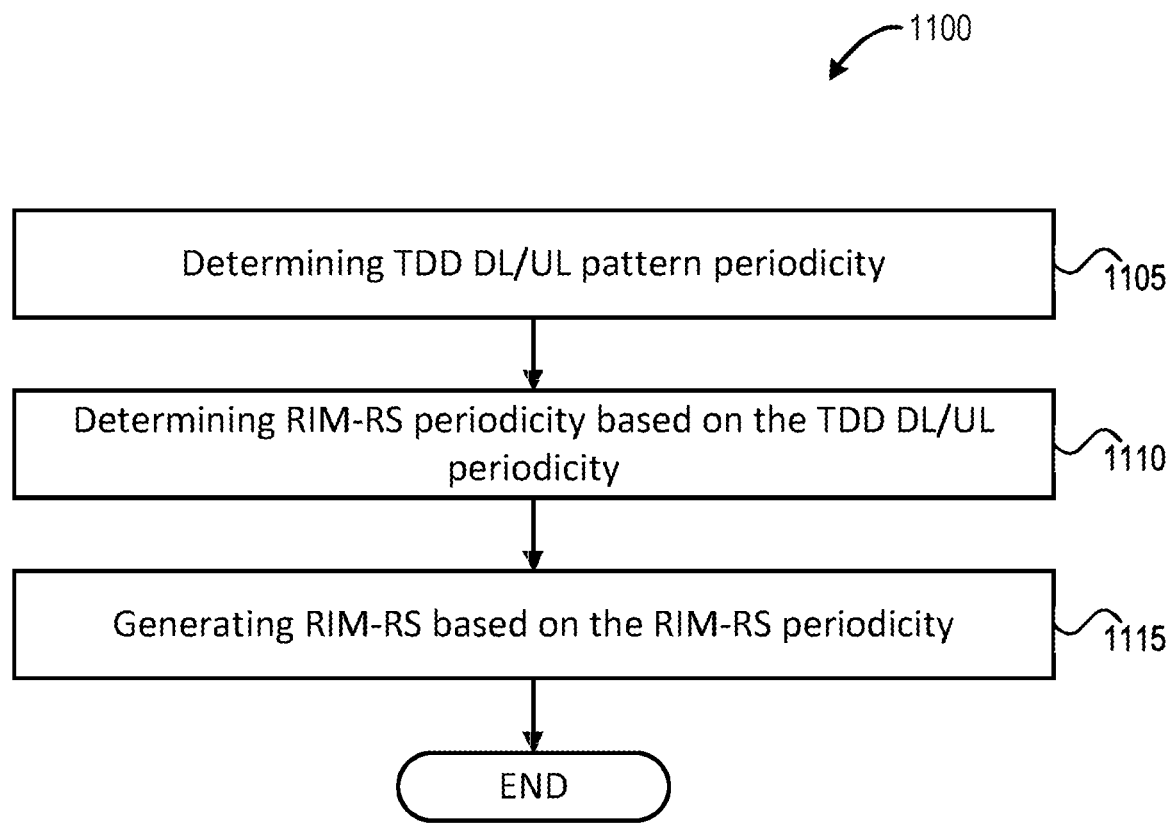
FIG. 11 depicts an example procedure for practicing the various embodiments discussed herein.

FIG. 11 shows an example procedure 1100 in accordance with various embodiments. For illustrative purposes, the various operations of procedure 1100 are described as being performed by elements/entities of FIGS. 1-10. In some embodiments, the procedure 1100 may be embodied as one or more computer-readable storage media comprising program code, instructions, or other like a computer program product (or data to create the computer program product), which is to cause the baseband circuitry and/or application circuitry of the RAN node 111 to perform electronic operations and/or to perform the specific sequence or flow of actions described with respect to FIG. 11. While particular examples and orders of operations are illustrated FIG. 11, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

The procedure 1100 begins at operation 1105 where a RAN node determines a periodicity of a TDD DL/UL pattern. The TDD DL/UL pattern periodicity may be configured to all RAN nodes of an operator. In many examples, the RAN nodes may be configured with the same TDD DL/UL pattern periodicities.

The procedure 1100 may further include operation 1110 in which the RAN node determines a RIM-RS periodicity based on the TDD DL/UL pattern periodicity. In some embodiments, the RAN node may be configured with an integer parameter, for example, m, that indicates a multiple and the RAN node may determine that the RIM-RS periodicity is the multiple of the periodicity of the TDD DL/UL pattern. In some embodiments, the RIM-RS transmission periodicity may be based on the TDD DL/UL pattern periodicity according to Table 1 described herein.

The procedure 1100 may further include operation 1115 in which the RAN node generates the RIM-RS based on the RIM-RS periodicity. In some embodiments, the RAN node may also generate the RIM-RS based on a configurable time location in which the RIM-RS is to be transmitted. For example this configurable time location may be at a particular DL transition point of a concatenated TDD DL/UL pattern, or some other location.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a method of operating a gNB, the method comprising: determining a time division duplex (TDD) downlink/uplink (DL/UL) pattern periodicity that corresponds to a TDD DL/UL pattern with which the gNB is configured; determining a remote interference management-reference signal (RIM-RS) periodicity based on the TDD DL/UL pattern periodicity; and generating a RIM-RS for transmission based on the RIM-RS periodicity.

Example 2 includes the method of example 1 or some other example herein, further comprising determining the RIM-RS periodicity is an integer multiple of the TDD DL/UL pattern periodicity.

Example 3 includes a method of example 2 or some other example herein, wherein the TDD DL/UL pattern includes a plurality of concatenated TDD DL/UL patterns and the TDD DL/UL pattern periodicity is equal to a sum of a plurality of concatenated TDD DL/UL pattern periodicities that respectively correspond to the plurality of concatenated TDD DL/UL patterns.

Example 4 includes the method of example 1 or some other example herein, further comprising: determining, based on configuration information, a time location of the RIM-RS; and generating the RIM-RS for transmission based on the time location.

Example 5 includes the method of example 1 or some other example herein, wherein the time location is to align an end of the RIM-RS with an end of a DL boundary of the TDD DL/UL pattern.

Example 6 includes a method of example 5 or some other example herein, wherein the TDD DL/UL pattern includes a plurality of concatenated TDD DL/UL patterns and the DL boundary corresponds to one of the plurality of concatenated TDD DL/UL patterns.

Example 7 includes a method of example 1 or some other example herein, further comprising: generating the RIM-RS for transmission in one or more RIM-RS transmission occasions within an RIM-RS transmission period.

Example 8 includes the method of example 7 or some other example herein, further comprising: determining an index of the one or more RIM-RS transmission occasions based on a set identifier of a transmitter of the gNB; and generating the RIM-RS for transmission in the one or more RIM-RS transmission occasions based on the set identifier.

Example 9 includes a method of operating a gNB, the method comprising: determining, based on the configuration information, a time-location configured for a remote interference management-reference signal (RIM-RS), wherein the time-location is configured with respect to a switching point within a time division duplex downlink/uplink (TDD DL/UL) pattern; and generating the RIM-RS for transmission based on the time-location.

Example 10 includes method of example 9 or some other example herein, further comprising transmitting the RIM-RS.

Example 11 includes a method of example 9 or some other example herein, further comprising: determining a TDD DL/UL pattern periodicity that corresponds to the TDD DL/UL pattern; determining a RIM-RS periodicity based on the TDD DL/UL pattern periodicity; and generating the RIM-RS for transmission based on the RIM-RS periodicity.

Example 12 includes the method of example 11 or some other example herein, further comprising: determining the RIM-RS periodicity is an integer multiple of the TDD DL/UL pattern periodicity.

Example 13 includes the method of example 12 or some other example herein, wherein the TDD DL/UL pattern includes a plurality of concatenated TDD DL/UL patterns and the TDD DL/UL pattern periodicity is equal to a sum of a plurality of concatenated TDD DL/UL pattern periodicities that respectively correspond to the plurality of concatenated TDD DL/UL patterns. Example 14 includes a method of example 9 or some other example herein, wherein the time location is to align an end of the RIM-RS with an end of a DL boundary of the TDD DL/UL pattern.

Example 15 includes the method of example 14 or some other example herein, wherein the TDD DL/UL pattern includes a plurality of concatenated TDD DL/UL patterns and the DL boundary corresponds to one of the plurality of concatenated TDD DL/UL patterns.

Example 16 includes the method of example 9 or some other example herein, further comprising: generating the RIM-RS for transmission in one or more RIM-RS transmission occasions within an RIM-RS transmission period.

Example 17 includes a method of example 16 or some other example herein, further comprising: determining an index of the one or more RIM-RS transmission occasions based on a set identifier of a transmitter of the gNB; and generating the RIM-RS for transmission in the one or more RIM-RS transmission occasions based on the set identifier Example 18 includes a method of operating a first RAN node, the method comprising: monitoring for a remote interference management-reference signal (RIM-RS) in a first time division duplex (TDD) period; detecting the RIM-RS in the first TDD period; extracting, based on detection of the RIM-RS, a set identifier (ID) associated with a second RAN node that transmitted the RIM-RS; and saving the set ID in memory.

Example 19 includes the method of example 18 or some other example herein, wherein monitoring for the RIM-RS includes determining a time location configured with respect to a switching point within a TDD downlink/uplink pattern.

Example 20 includes the method of example 18 or some other example herein, wherein the method further comprises: providing an indication of the set ID to a management node of a network.

Example 21 may include an apparatus comprising means to perform one or more elements of a method described in or related to any of examples 1-20, or any other method or process described herein. Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein. Example 23 may include an apparatus comprising logic, modules, or circuitry to perform one or more elements of a method described in or related to any of examples 1-20, or any other method or process described herein. Example 24 may include a method, technique, or process as described in or related to any of examples 1-20, or portions or parts thereof. Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof. Example 26 may include a signal as described in or related to any of examples 1-20, or portions or parts thereof. Example 27 may include a datagram, packet, frame, segment, protocol data unit (PDU), or message as described in or related to any of examples 1-20, or portions or parts thereof, or otherwise described in the present disclosure. Example 28 may include a signal encoded with data as described in or related to any of examples 1-20, or portions or parts thereof, or otherwise described in the present disclosure. Example 29 may include a signal encoded with a datagram, packet, frame, segment, protocol data unit (PDU), or message as described in or related to any of examples 1-20, or portions or parts thereof, or otherwise described in the present disclosure. Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof. Example 31 may include a computer program comprising instructions, wherein execution of the program by a processing element is to cause the processing element to carry out the method, techniques, or process as described in or related to any of examples 1-20, or portions thereof. Example 32 may include a signal in a wireless network as shown and described herein. Example 33 may include a method of communicating in a wireless network as shown and described herein. Example 34 may include a system for providing wireless communication as shown and described herein. Example 35 may include a device for providing wireless communication as shown and described herein.

Any of the above-described examples may be combined with any other example (or combination of examples), unless explicitly stated otherwise. The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous. The term "coupled" (or variants thereof) may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "communicatively coupled" may mean that two or more elements may be in contact with one another by a means of communication including through a wire or other interconnect connection, through a wireless communication channel or ink, and/or the like.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

What is claimed is:

1. A non-transitory computer-readable medium (CRM) having instructions that, when executed by one or more processors, causes a first radio access network (RAN) node to perform operations, the operations comprising:
    monitoring in a first time division duplex (TDD) interval and in a second TDD interval for a remote interference management-reference signal (RIM-RS) transmitted from a second RAN node, wherein the first TDD interval corresponds to a first set identifier (ID) used by the second RAN node and the second TDD interval corresponds to a second set ID used by the second RAN node;
    detecting the RIM-RS in the first TDD interval and not the second TDD interval;
    determining, based on detection of the RIM-RS in the first TDD interval and not the second TDD interval, that the second RAN node is operating according to the first set ID associated with a first transmitter of the second RAN node that transmitted the RIM-RS; and
    saving the first set ID in memory.

2. The non-transitory CRM of claim 1, wherein the operations further comprise determining a time location configured with respect to a switching point within a TDD downlink/uplink pattern.

3. The non-transitory CRM of claim 1, wherein the operations further comprise:
    providing an indication of the first set ID to a management node of a network.

4. The non-transitory CRM of claim 1, wherein the first TDD interval includes a plurality of RIM-RS transmission occasions.

5. The non-transitory CRM of claim 4, wherein the detecting the RIM-RS in the first TDD interval and not the second TDD interval further comprises detecting the RIM-RS in at least one of the plurality of RIM-RS transmission occasions of the first TDD interval.

6. The non-transitory CRM of claim 1, wherein the second set ID is associated with a second transmitter of the second RAN node.

7. The non-transitory CRM of claim 1, wherein the operations further comprise determining that the second RAN node causes remote interference in response to detecting the RIM-RS in the first TDD interval and not the second TDD interval.

8. A method of operating a first radio access network (RAN) node, comprising:
monitoring in a first time division duplex (TDD) interval and in a second TDD interval for a remote interference management-reference signal (RIM-RS) transmitted from a second RAN node, wherein the first TDD interval corresponds to a first set identifier (ID) used by the second RAN node and the second TDD interval corresponds to a second set ID used by the second RAN node;
detecting the RIM-RS in the first TDD interval and not the second TDD interval;
determining, based on detection of the RIM-RS in the first TDD interval and not the second TDD interval, that the second RAN node is operating according to the first set ID associated with a first transmitter of the second RAN node that transmitted the RIM-RS; and
saving the first set ID in memory.

9. The method of claim 8, further comprising determining a time location configured with respect to a switching point within a TDD downlink/uplink pattern.

10. The method of claim 8, further comprising:
providing an indication of the first set ID to a management node of a network.

11. The method of claim 8, wherein the first TDD interval includes a plurality of RIM-RS transmission occasions.

12. The method of claim 11, wherein the detecting the RIM-RS in the first TDD interval and not the second TDD interval further comprises detecting the RIM-RS in at least one of the plurality of RIM-RS transmission occasions of the first TDD interval.

13. The method of claim 8, wherein the second set ID is associated with a second transmitter of the second RAN node.

14. The method of claim 8, further comprising determining that the second RAN node causes remote interference in response to detecting the RIM-RS in the first TDD interval and not the second TDD interval.

15. A first radio access network (RAN) node, comprising:
radio front end circuitry configured to perform wireless communication over a wireless network; and
processor circuitry, coupled to the radio front end circuitry, configured to:
monitor in a first time division duplex (TDD) interval and in a second TDD interval for a remote interference management-reference signal (RIM-RS) transmitted from a second RAN node, wherein the first TDD interval corresponds to a first set identifier (ID) used by the second RAN node and the second TDD interval corresponds to a second set ID used by the second RAN node;
detect the RIM-RS in the first TDD interval and not the second TDD interval;
determine, based on the detection of the RIM-RS in the first TDD interval and not the second TDD interval, that the second RAN node is operating according to the first set ID associated with a first transmitter of the second RAN node that transmitted the RIM-RS; and
save the first set ID in memory.

16. The first RAN node of claim 15, wherein the processor circuitry is further configured to determine a time location configured with respect to a switching point within a TDD downlink/uplink pattern.

17. The first RAN node of claim 15, wherein the processor circuitry is further configured to:
provide an indication of the first set ID to a management node of a network.

18. The first RAN node of claim 15, wherein the first TDD interval includes a plurality of RIM-RS transmission occasions.

19. The first RAN node of claim 18, wherein to detect the RIM-RS in the first TDD interval and not the second TDD interval, the processor circuitry is further configured to detect the RIM-RS in at least one the plurality of RIM-RS transmission occasions of the first TDD interval.

20. The first RAN node of claim 15, wherein the second set ID is associated with a second transmitter of the second RAN node.

* * * * *